(12) United States Patent
Fujita et al.

(10) Patent No.: US 7,348,043 B2
(45) Date of Patent: Mar. 25, 2008

(54) LIQUID CRYSTAL COMPOSITION AND LIQUID CRYSTAL DISPLAY DEVICE

(75) Inventors: Hiroaki Fujita, Chiba (JP); Norikatsu Hattori, Chiba (JP)

(73) Assignees: Chisso Corporation, Tokyo (JP); Chisso Petrochemical Corporation, Tokyo (JP)

( * ) Notice: Subject to any disclaimer, the term of this patent is extended or adjusted under 35 U.S.C. 154(b) by 182 days.

(21) Appl. No.: 11/293,121

(22) Filed: Dec. 5, 2005

(65) Prior Publication Data
US 2006/0118764 A1 Jun. 8, 2006

(30) Foreign Application Priority Data
Dec. 6, 2004 (JP) .............................. 2004-353182

(51) Int. Cl.
*C09K 19/30* (2006.01)
*C09K 19/12* (2006.01)

(52) U.S. Cl. ............. 428/1.1; 252/299.01; 252/299.63; 252/299.66

(58) Field of Classification Search ................. 428/1.1; 252/299.63, 299.66, 299.67, 299.01
See application file for complete search history.

(56) References Cited
FOREIGN PATENT DOCUMENTS
JP 10-291945 11/1998

OTHER PUBLICATIONS

English translation by computer for JP 10-291945, http://www4.ipdl.inpit.go.jp/Tokujitu/PAJdetail.ipdl?N0000=60&N0120=01&N2001=2&N3001=H10-291945.*

* cited by examiner

Primary Examiner—Shean C Wu
(74) Attorney, Agent, or Firm—Hogan & Hartson LLP

(57) ABSTRACT

A liquid crystal composition comprising as a first component at least two compounds selected from the group of compounds represented by formula (1), and having a negative dielectric anisotropy:

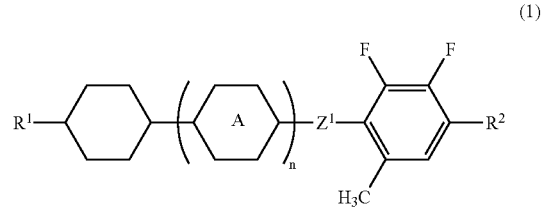

(1)

wherein $R^1$ is independently alkyl having 1 to 10 carbons or alkenyl having 2 to 10 carbons; $R^2$ is independently alkyl having 1 to 10 carbons, alkenyl having 2 to 10 carbons, or alkoxy having 1 to 9 carbons; $Z^1$ is independently a single bond, —$C_2H_4$—, —$CH_2O$—, or —CH=CH—; ring A is independently 1,4-cyclohexylene or 1,4-phenylene; and n is independently 0 or 1.

9 Claims, No Drawings

LIQUID CRYSTAL COMPOSITION AND LIQUID CRYSTAL DISPLAY DEVICE

BACKGROUND OF THE INVENTION

1. Field of the Invention

The invention relates to a liquid crystal composition suitable for use in an active matrix (AM) device, and an AM device containing the composition.

2. Related Art

In a liquid crystal display device, classification is based on an operating mode of the liquid crystals, including phase change (PC), twisted nematic (TN), super twisted nematic (STN), electrically controlled birefringence (ECB), optically compensated bend (OCB), in-plane switching (IPS), vertical alignment (VA), and so forth. Classification based on a driving mode includes a passive matrix (PM) and an active matrix (AM). PM is further classified into static, multiplex and so forth, and AM is classified into a thin film transistor (TFT), a metal insular metal (MIM) and so forth. TFT is further classified into amorphous silicon, polycrystal silicon, and continuous grain silicon. The polycrystal silicon is classified into a high temperature type and a low temperature type according to a production process. Classification based on a light source includes a reflection type utilizing a natural light, a transmission type utilizing a backlight and a semi-transmission type utilizing both the natural light and the backlight.

Table 1 below summarizes a relationship between the general characteristics of liquid crystal compositions and AM devices. The general characteristics of the composition will be explained further based on a commercially available AM device. A temperature range of a nematic phase relates to the temperature range in which the device can be used. A desirable maximum temperature of the nematic phase is approximately 70° C. or more and a desirable minimum temperature is approximately −20° C. or less. The viscosity of the composition relates to the response time of the device. A short response time is desirable for displaying a moving image. Accordingly, a small viscosity of the composition is desirable. A small viscosity at a low temperature is more desirable.

| No. | General characteristics of a composition | General characteristics of an AM Device |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Dielectric anisotropy is positively or negatively large | Driving voltage is low and electric power consumption is small |
| 5 | Specific resistance is large | Voltage holding ratio is large and a contrast ratio is large |

[1]A liquid crystal composition can be injected into a cell in a short time.

Table 1. General Characteristics of a Liquid Crystal Composition and an AM Device The optical anisotropy of the composition relates to the contrast ratio of the device. A device having a mode such as VA, IPS and so forth utilizes electrically controlled birefringence. Accordingly, a product (Δn·d) of the optical anisotropy (Δn) of the composition and the cell gap (d) of the device is designed to be a certain value to maximize the contrast ratio in the VA mode. Examples of the value include approximately 0.30 μm to approximately 0.35 μm (VA mode) or approximately 0.20 μm to approximately 0.30 μm (IPS mode). The cell gap (d) is generally from approximately 3 μm to approximately 6 μm, and the optical anisotropy of the composition is in the range of approximately 0.05 to approximately 0.11. A large dielectric anisotropy of the composition contributes to a small driving voltage. Accordingly, a large dielectric anisotropy is desirable. In an ordinary AM device, a composition having a positive dielectric anisotropy is employed. In an AM device having a VA mode, a composition having a negative dielectric anisotropy is employed. A large specific resistance of the composition contributes to a large voltage holding ratio and a large contrast ratio of the device. Accordingly, a composition having a large specific resistance in the initial stage is desirable. A composition having a large specific resistance after using for a long time is desirable.

A composition having a negative dielectric anisotropy contains a compound having a negative anisotropy. Examples of the compound include a compound having a negative dielectric anisotropy containing 6-methyl-2,3-difluoro-1,4-phenylene as disclosed, for example, in JP H10-291945 A/1998.

SUMMARY OF THE INVENTION

The invention relates to a liquid crystal composition containing as a first component at least two compounds selected from the group of compounds represented by formula (1), and having a negative dielectric anisotropy:

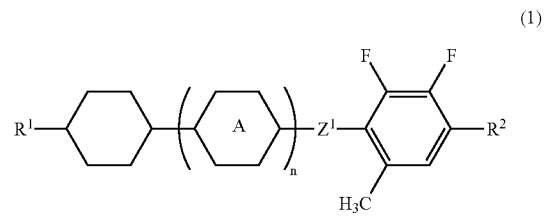

(1)

wherein $R^1$ is independently alkyl having 1 to 10 carbons or alkenyl having 2 to 10 carbons; $R^2$ is independently alkyl having 1 to 10 carbons, alkenyl having 2 to 10 carbons, or alkoxy having 1 to 9 carbons; $Z^1$ is independently a single bond, —$C_2H_4$—, —$CH_2O$—, or —CH=CH—; ring A is independently 1,4-cyclohexylene or 1,4-phenylene; and n is independently 0 or 1. The invention also relates to a liquid crystal composition including the compound, a liquid crystal display device including the liquid crystal composition, and so forth.

DETAILED DESCRIPTION OF THE INVENTION

Terms used in the specification and claims are defined as follows. The liquid crystal composition of the invention or the liquid crystal display device of the invention may occasionally be expressed simply as "the composition" or "the device," respectively. A liquid crystal display device is a generic term for a liquid crystal display panel and a liquid crystal display module. A device driven by an active matrix may occasionally be expressed simply as "an AM device." A device having a TN mode may occasionally expressed simply as "a TN device." Device having the other modes may occasionally be expressed simply in the similar manners. Main components of the liquid crystal composition are liquid crystal compounds. The liquid crystal compound is a generic term for a compound having a liquid crystal phase such as a nematic phase, a smectic phase and so forth, and also for a compound having no liquid crystal phase but being useful as a component of a composition. Formulae (1) to (1-2-4) may occasionally be expressed simply as formula (1). The other formulae may occasionally expressed simply in the similar manners. Formulae (2-1-1) and (2-1-2) may occasionally be expressed simply as formula (2-1). The other formulae may occasionally expressed simply in the similar manners. At least one compound selected from a group of compounds represented by formula (2-1) may be occasionally abbreviated to "the compound (2-1)." The compounds concerning the other formulae may occasionally expressed simply in the similar manners.

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance in the initial stage, and the composition has a large specific resistance even after it has been used for a long time. "A voltage holding ratio is large" means that a device has a large voltage holding ratio in the initial stage, and the device has a large voltage holding ratio even after it has been used for a long time. The characteristics such as optical anisotropy and so forth are explained in terms of values measured by means of the methods specified in the Examples. The content (percentage) of a liquid crystal compound in a composition means the percentage by weight (% by weight) based on the total weight of liquid crystal compounds.

The invention provides a liquid crystal composition that has desirable characteristics, including a wide temperature range of a nematic phase, a small viscosity, a suitable optical anisotropy, a large negative dielectric anisotropy and a large specific resistance. One aspect of the invention is to provide a liquid crystal composition properly balanced regarding many of the above characteristics. Another aspect of the invention is to provide a liquid crystal composition that satisfies a wide temperature range of a nematic phase, particularly a liquid crystal composition that satisfies a minimum temperature of a nematic phase of not more than approximately −20° C. A further aspect of the invention is to provide a liquid crystal device that contains the composition and has a large voltage holding ratio. Another aspect of the invention is to provide an AM device that contains a composition having many desirable characteristics, including, for example, a small viscosity, an optical anisotropy ranging from approximately 0.05 to approximately 0.11, and a dielectric anisotropy ranging from approximately −6.5 to approximately −1.5, and is suitable for a mode such as VA and IPS.

The features of the invention include, but are not limited to, the following features:

1. A liquid crystal composition containing as a first component at least two compounds selected from the group of compounds represented by formula (1):

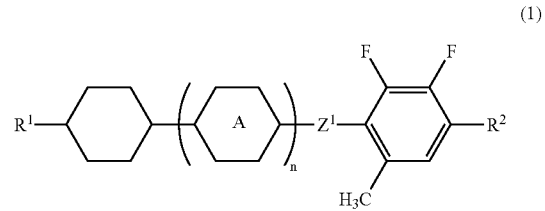

wherein $R^1$ is independently alkyl having 1 to 10 carbons or alkenyl having 2 to 10 carbons; $R^2$ is independently alkyl having 1 to 10 carbons, alkenyl having 2 to 10 carbons, or alkoxy having 1 to 9 carbons; $Z^1$ is independently a single bond, —$C_2H_4$—, —$CH_2O$—, or —CH=CH—; ring A is independently 1,4-cyclohexylene or 1,4-phenylene; n is independently 0 or 1; and wherein the liquid crystal composition has a negative dielectric anisotropy.

2. The liquid crystal composition according to item 1, wherein the first component is at least one compound selected from the group of compounds represented by formula (1) wherein n=0, and at least one compound is selected from the group of compounds represented by formula (1) wherein n=1.

3. The liquid crystal composition according to items 1 or 2, wherein the liquid crystal composition includes approximately 20% to approximately 60% by weight based on the total weight of the liquid crystal composition of the component of the compound represented by formula (1) wherein n=0 and approximately 40% to approximately 80% by weight based on the total weight of the liquid crystal composition of the component of the compound represented by formula (1) wherein n=1.

4. A liquid crystal composition comprising as a first component at least one compound selected from the group of compounds represented by formula (1), and as a second component at least one compound selected from the group of compounds represented by formulae (2-1) to (2-3) y:

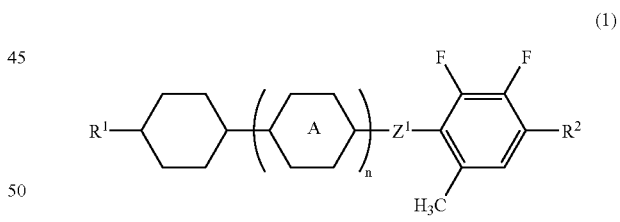

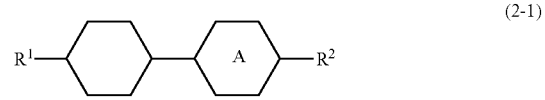

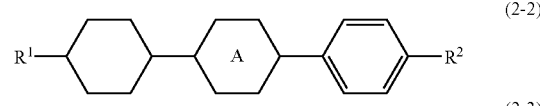

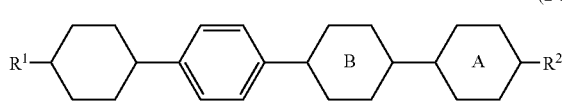

wherein $R^1$ is independently alkyl having 1 to 10 carbons or alkenyl having 2 to 10 carbons; $R^2$ is independently alkyl having 1 to 10 carbons, alkenyl having 2 to 10 carbons, or alkoxy having 1 to 9 carbons; ring A is independently 1,4-cyclohexylene or 1,4-phenylene; ring B is independently 1,4-phenylene or 1,4-phenylene in which an arbitrary hydrogen is replaced by a fluorine; n is independently 0 or 1; and wherein the liquid crystal composition has a negative dielectric anisotropy.

5. The liquid crystal composition according to item 4, wherein the liquid crystal composition includes approximately 30% to approximately 95% by weight based on the total weight of the liquid crystal composition of the first component, and approximately 5% to approximately 70% by weight based on the total weight of the liquid crystal composition of the second component.

6. A liquid crystal composition comprising as a first component at least one compound selected from the group of compounds represented by formula (1), and as a second component at least one compound selected from the group of compounds represented by formulae (3) to (5):

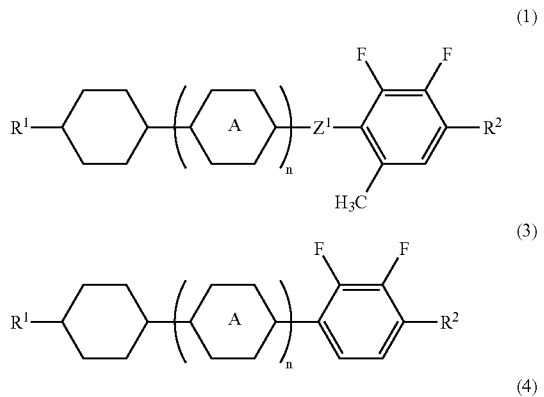

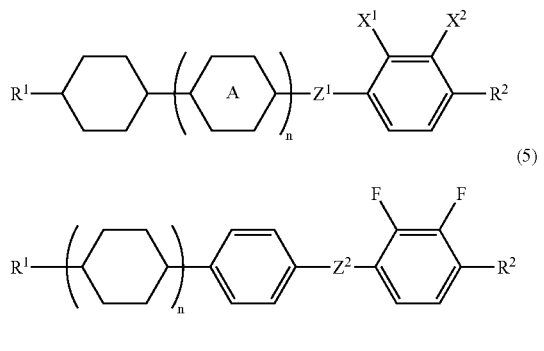

wherein $R^1$ is independently alkyl having 1 to 10 carbons or alkenyl having 2 to 10 carbons; $R^2$ is independently alkyl having 1 to 10 carbons, alkenyl having 2 to 10 carbons, or alkoxy having 1 to 9 carbons; $Z^1$ is independently a single bond, —$C_2H_4$—, —$CH_2O$—, or —CH═CH—; $Z^2$ is independently —$CF_2O$—, —$OCF_2$—, —$C_2H_4CF_2O$—, or —$OCF_2C_2H_4$—; ring A is independently 1,4-cyclohexylene or 1,4-phenylene; one of $X^1$ and $X^2$ is —F, and the other thereof is —$CF_2H$; n is independently 0 or 1; and wherein the liquid crystal composition has a negative dielectric anisotropy.

7. The liquid crystal composition according to item 6, wherein the liquid crystal composition includes approximately 10% to approximately 90% by weight based on the total weight of the liquid crystal composition of the first component and approximately 10% to approximately 90% by weight based on the total weight of the liquid crystal composition of the second component.

8. The liquid crystal composition according to any one of items 1-7, wherein the first component is at least one compound selected from the group of compounds represented by formula (1-1):

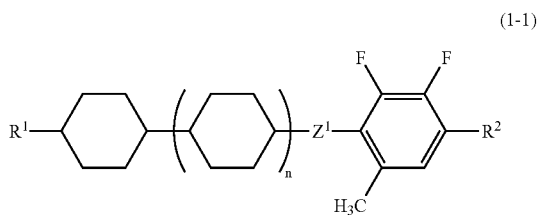

wherein $R^1$ is independently alkyl having 1 to 10 carbons or alkenyl having 2 to 10 carbons; $R^2$ is independently alkyl having 1 to 10 carbons, alkenyl having 2 to 10 carbons, or alkoxy having 1 to 9 carbons; $Z^1$ is independently a single bond, —$C_2H_4$—, —$CH_2O$—, or —CH═CH—; and n is independently 0 or 1.

9. A liquid crystal composition comprising as a first component at least one compound selected from the group of compounds represented by formula (1), as a second component at least one compound selected from the group of compounds represented by formulae (2-1) to (2-3), and as a third component at least one compound selected from the group of compounds represented by formulae (3) to (5), the liquid crystal composition having a negative dielectric anisotropy:

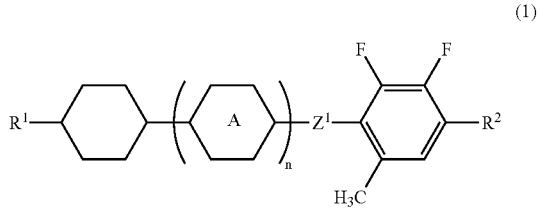

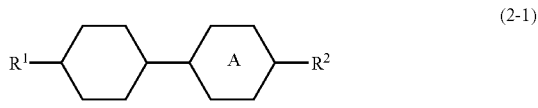

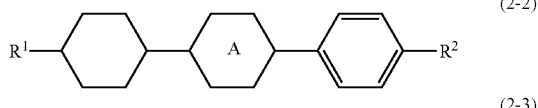

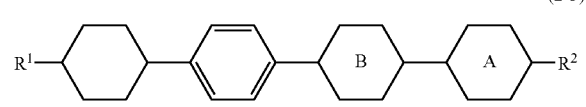

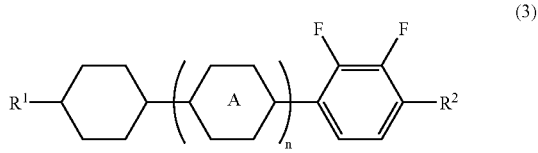

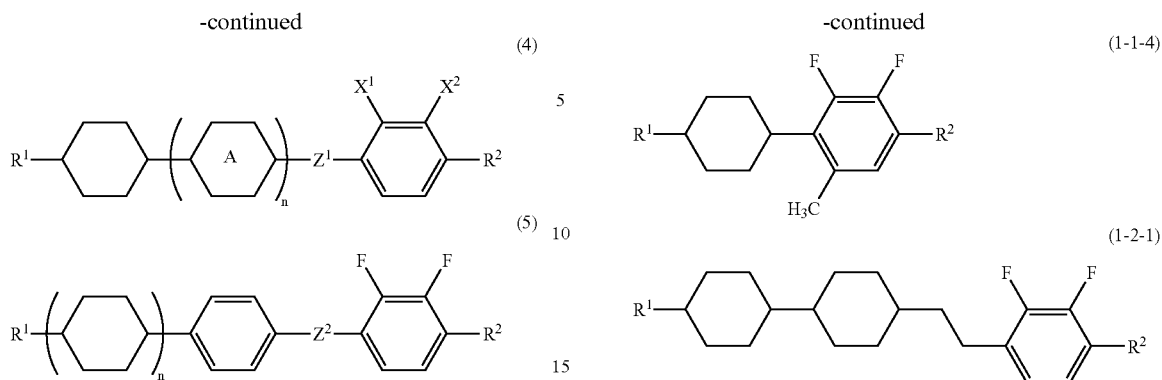

wherein $R^1$ is independently alkyl having 1 to 10 carbons or alkenyl having 2 to 10 carbons; $R^2$ is independently alkyl having 1 to 10 carbons, alkenyl having 2 to 10 carbons, or alkoxy having 1 to 9 carbons; $Z^1$ is independently a single bond, —$C_2H_4$—, —$CH_2O$—, or —CH=CH—; $Z^2$ is independently —$CF_2O$—, —$OCF_2$—, —$C_2H_4CF_2O$—, or —$OCF_2C_2H_4$—; ring A is independently 1,4-cyclohexylene or 1,4-phenylene; ring B is independently 1,4-phenylene or 1,4-phenylene in which an arbitrary hydrogen is replaced by a fluorine; one of $X^1$ and $X^2$ is —F, and the other thereof is —$CF_2H$; and n is independently 0 or 1.

10. The liquid crystal composition according to item 9, wherein the liquid crystal composition includes approximately 10% to approximately 85% by weight based on the total weight of the liquid crystal composition of the first component, approximately 5% to approximately 75% by weight based on the total weight of the liquid crystal composition of the second component and approximately 10% to approximately 85% by weight based on the total weight of the liquid crystal composition of the third component.

11. The liquid crystal composition according to any one of items 1-10, wherein the first component is at least one compound selected from the group of compounds represented by formulae (1-1-1) to (1-1-4) and (1-2-1) to (1-2-4):

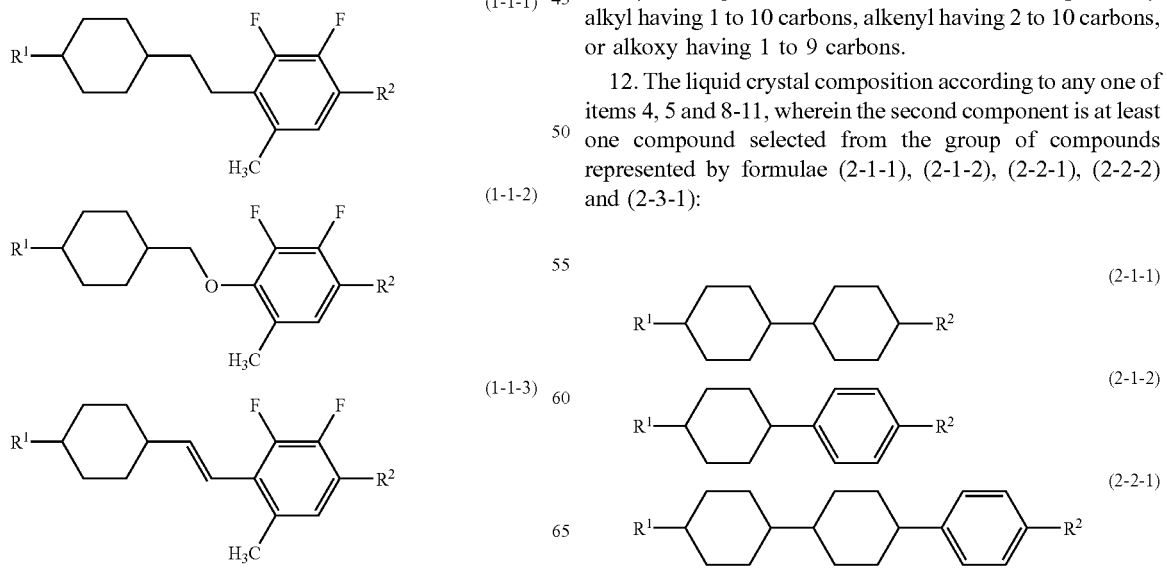

wherein $R^1$ is independently alkyl having 1 to 10 carbons or alkenyl having 2 to 10 carbons; and $R^2$ is independently alkyl having 1 to 10 carbons, alkenyl having 2 to 10 carbons, or alkoxy having 1 to 9 carbons.

12. The liquid crystal composition according to any one of items 4, 5 and 8-11, wherein the second component is at least one compound selected from the group of compounds represented by formulae (2-1-1), (2-1-2), (2-2-1), (2-2-2) and (2-3-1):

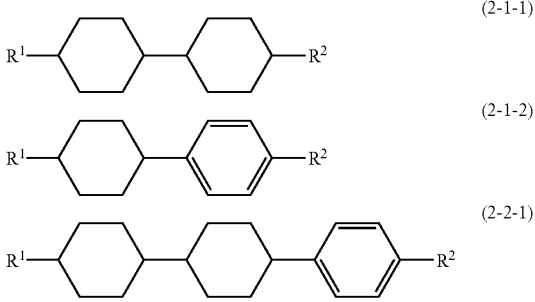

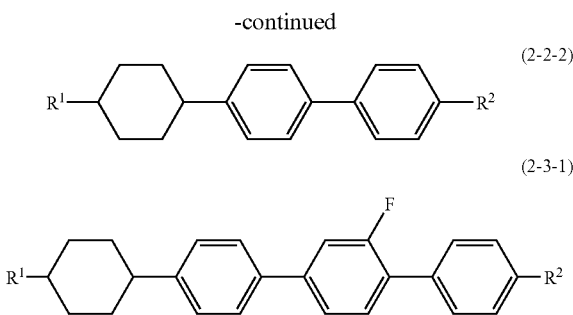

wherein R¹ is independently alkyl having 1 to 10 carbons or alkenyl having 2 to 10 carbons; and R² is independently alkyl having 1 to 10 carbons, alkenyl having 2 to 10 carbons, or alkoxy having 1 to 9 carbons.

13. The liquid crystal composition according to any one of items 6-12, wherein the third component is at least one compound selected from the group of compounds represented by formulae (3-1-1), (3-2-1), (3-2-2), (4-1-1), (4-2-1), (4-2-2), (5-1-1) and (5-2-1):

wherein R¹ is independently alkyl having 1 to 10 carbons or alkenyl having 2 to 10 carbons; and R² is independently alkyl having 1 to 10 carbons, alkenyl having 2 to 10 carbons, or alkoxy having 1 to 9 carbons.

14. A liquid crystal composition comprising as a first component at least one compound selected from the group of compounds represented by formula (1-1-1) to (1-1-4) and (1-2-1) to (1-2-4), as a second component at least one compound selected from the group of compounds represented by formulae (2-1-1), (2-1-2), (2-2-1), (2-2-2) and (2-3-1) and as a third component at least one compound selected from the group of compounds represented by formulae (3-1-1), (3-2-1), (3-2-2), (4-1-1), (4-2-2-1), (4-2-2-2), (5-1-1) and (5-2-1):

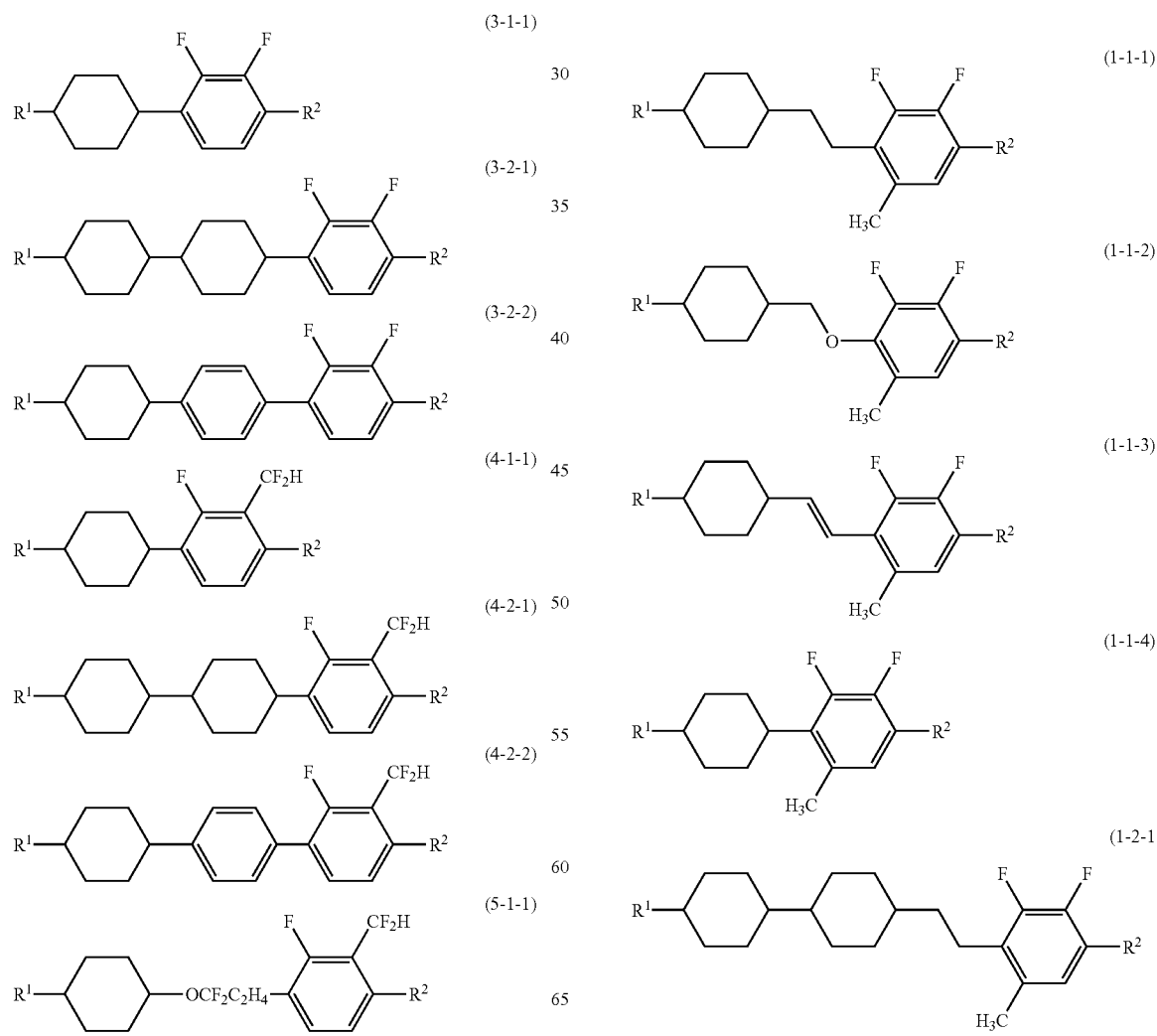

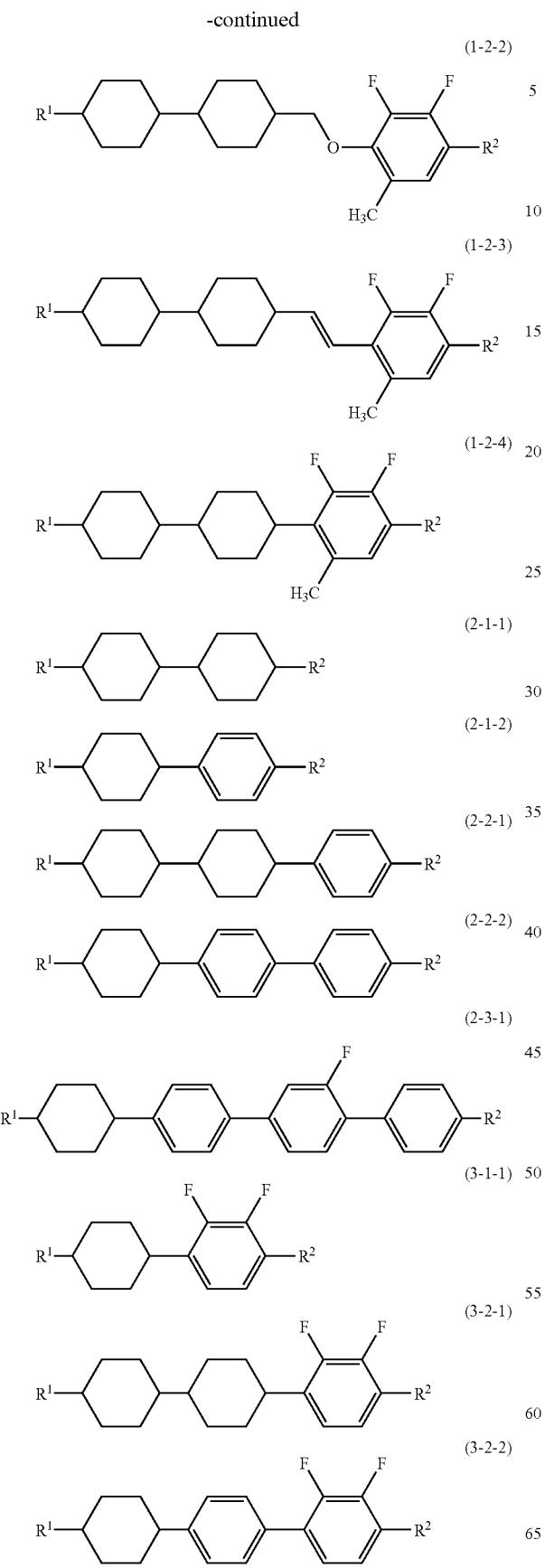
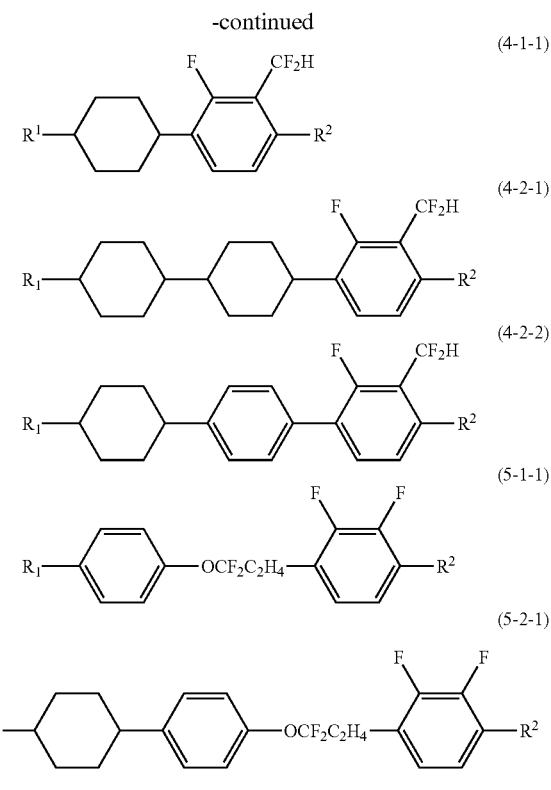

wherein $R^1$ independently alkenyl having 1 to 10 carbons or alkenyl having 2 to 10 carbons; $R^1$ is independently alkenyl having 1 to 10 carbons, alkenyl having 2 to 10 carbons, or alkoxy having 1 to 9 carbons; and wherein the liquid crystal composition has a negative dielectric anisotropy.

15. The liquid crystal composition according to item 14, wherein the liquid crystal composition includes approximately 10% to approximately 85% by component, approximately 5% to approximately 75% by weight based on the total weight of the liquid crystal composition of the second component and approximately 10% to approximately 85% by weight based on the total weight of the liquid crystal composition of the third component.

16. The liquid crystal composition according to any one of items 1-15, wherein the first component comprises at least one compound selected from the group of compounds represented by formula (1-1-1) to (1-1-3) and (1-2-1) to (1-2-3) in item 14.

17. The liquid crystal composition according to any one of items 4, 5 and 8-16, wherein the second component comprises at least one compound selected from the group of compounds represented by formula (2-1-1), (2-1-2) and (2-2-1) in item 14.

18. The liquid crystal composition according to any one of items 6 to 17, wherein the first component comprises at least one compound selected from the group of compounds represented by formula (3-1-1), (3-2-1), (4-1-1), (4-2-1), (5-1-1) and (5-2-1) in item 14.

19. A liquid crystal composition comprising as a first component at least one compound selected from the group of compounds represented by formula (1-1-1) to (1-1-3) and (1-2-1) to (1-2-3), as a second component at least one compound selected from the group of compounds represented by formulae (2-1-1), (2-1-2) and (2-2-1) and as a third component at least one compound selected from the group of compounds represented by formulae (3-1-1), (3-2-1), (4-1-1), (4-2-1), (5-1-1) and (5-2-1):

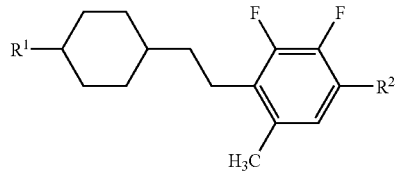
(1-1-1)

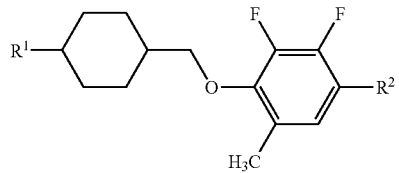
(1-1-2)

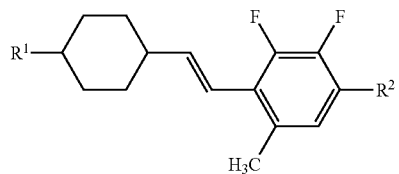
(1-1-3)

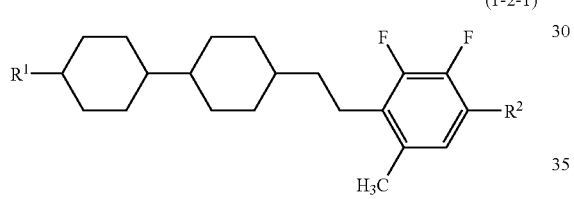
(1-2-1)

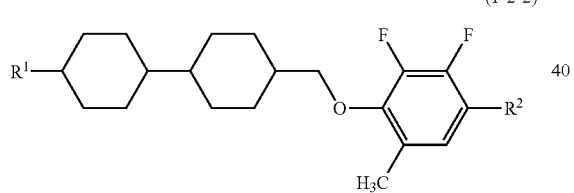
(1-2-2)

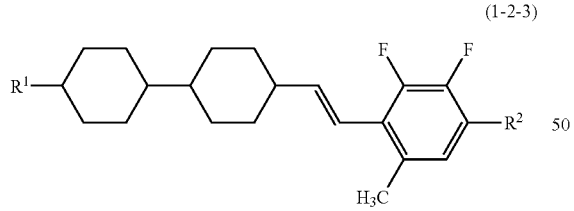
(1-2-3)

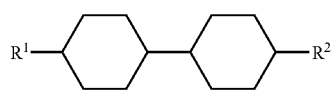
(2-1-1)

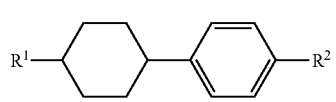
(2-1-2)

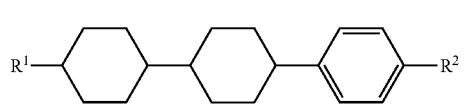
(2-2-1)

-continued

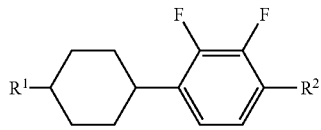
(3-1-1)

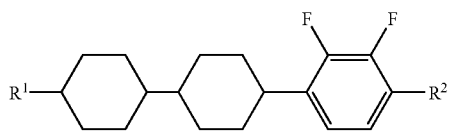
(3-2-1)

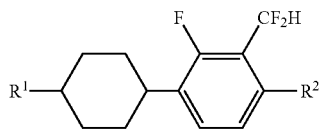
(4-1-1)

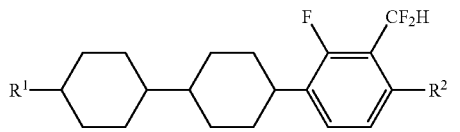
(4-2-1)

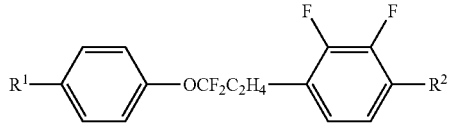
(5-1-1)

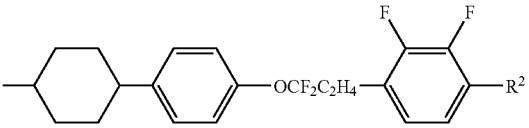
(5-2-1)

wherein $R^1$ is independently alkyl having 1 to 10 carbons or alkenyl having 2 to 10 carbons; $R^2$ is independently alkyl having 1 to 10 carbons, alkenyl having 2 to 10 carbons, or alkoxy having 1 to 9 carbons; and wherein the liquid crystal composition has a negative dielectric anisotropy.

20. The liquid crystal composition according to item 19, wherein the liquid crystal composition includes approximately 10% to approximately 85% by weight based on the total weight of the liquid crystal composition of the first component, approximately 5% to approximately 60% by weight based on the total weight of the liquid crystal composition of the second component and approximately 10 to approximately 80% by weight based on the total weight of the liquid crystal composition of the third component.

21. A liquid crystal composition comprising as a first component at least one compound selected from the group of compounds represented by formula (1-1-1) to (1-1-3) and (1-2-1) to (1-2-3), as a second component at least one compound selected from the group of compounds represented by formulae (2-1-1), (2-1-2) and (2-2-1) and as a third component at least one compound selected from the group of compounds represented by formulae (3-1-1) and (3-2-1):

(1-1-1)
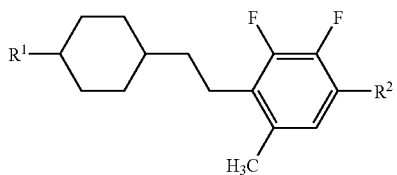

(1-1-2)
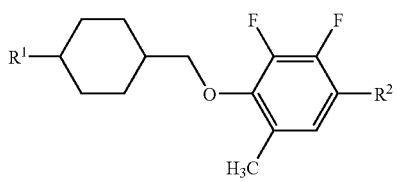

(1-1-3)
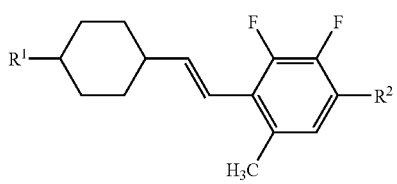

(1-2-1)
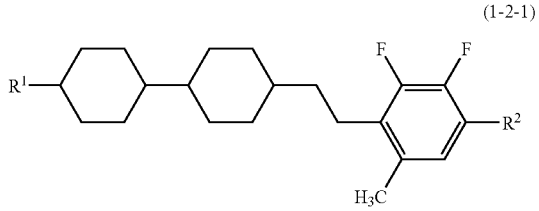

(1-2-2)
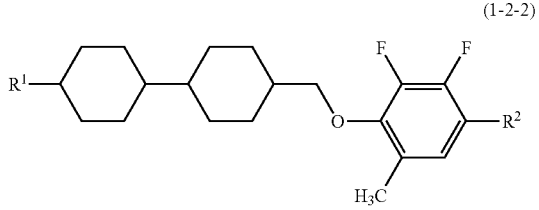

(1-2-3)
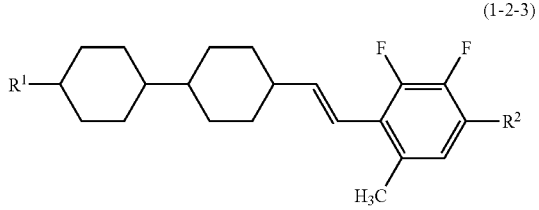

(2-1-1)
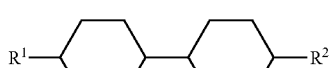

(2-1-2)
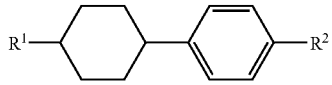

(2-2-1)

(3-1-1)
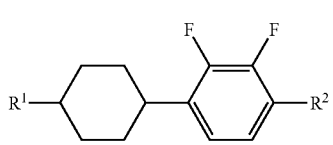

-continued (3-2-1)
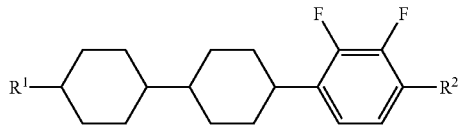

wherein $R^1$ is independently alkyl having 1 to 10 carbons or alkenyl having 2 to 10 carbons; $R^2$ is independently alkyl having 1 to 10 carbons, alkenyl having 2 to 10 carbons, or alkoxy having 1 to 9 carbons; and wherein the liquid crystal composition has a negative dielectric anisotropy.

22. The liquid crystal composition according to item 21, wherein the liquid crystal composition includes approximately 10% to approximately 85% by weight based on the total weight of the liquid crystal composition of the first component, approximately 5% to approximately 60% by weight based on the total weight of the liquid crystal composition of the second component and approximately 10% to approximately 70% by weight based on the total weight of the liquid crystal composition of the third component.

23. A liquid crystal composition comprising as a first component at least one compound selected from the group of compounds represented by formula (1-1-1) to (1-1-3) and (1-2-1) to (1-2-3), as a second component at least one compound selected from the group of compounds represented by formulae (2-1-1), (2-1-2) and (2-2-1) and as a third component at least one compound selected from the group of compounds represented by formulae (4-1-1), (4-2-1), (5-1-1) and (5-2-1):

(1-1-1)
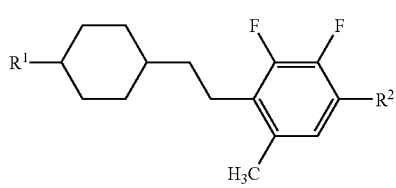

(1-1-2)
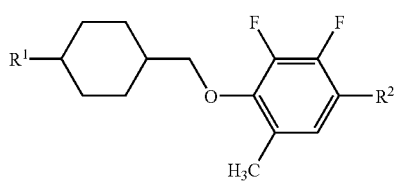

(1-1-3)
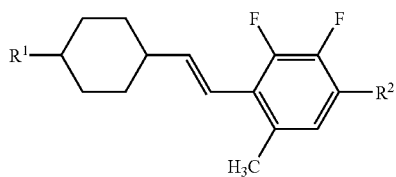

(1-2-1)
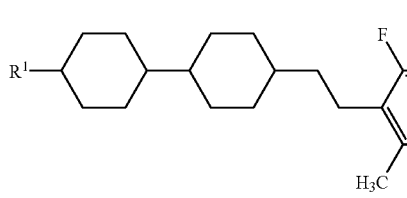

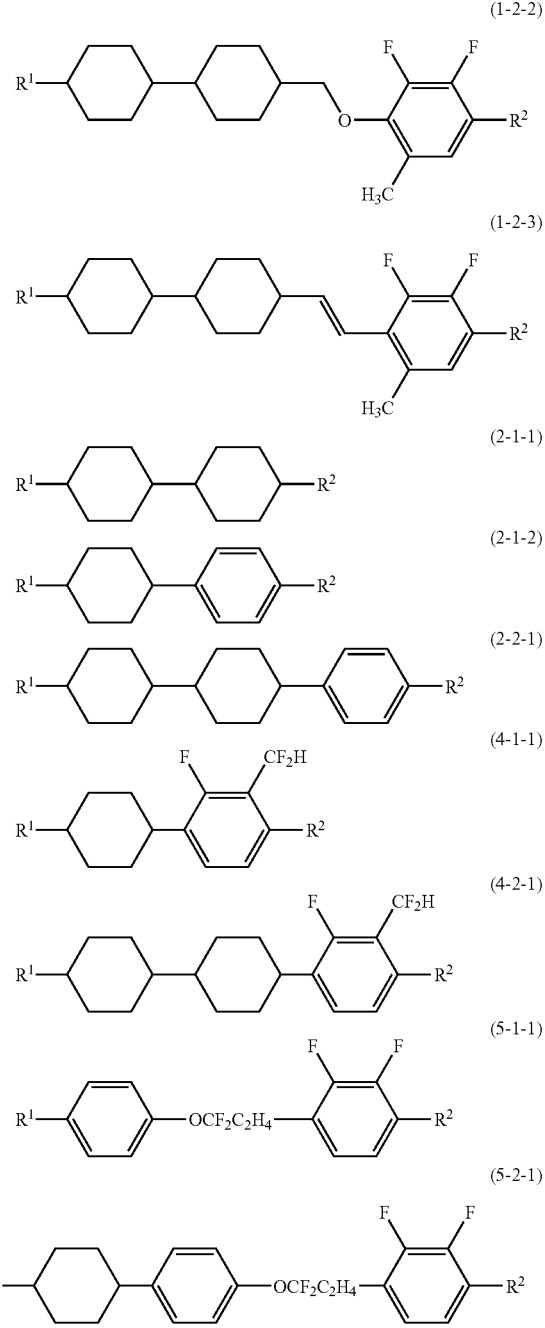
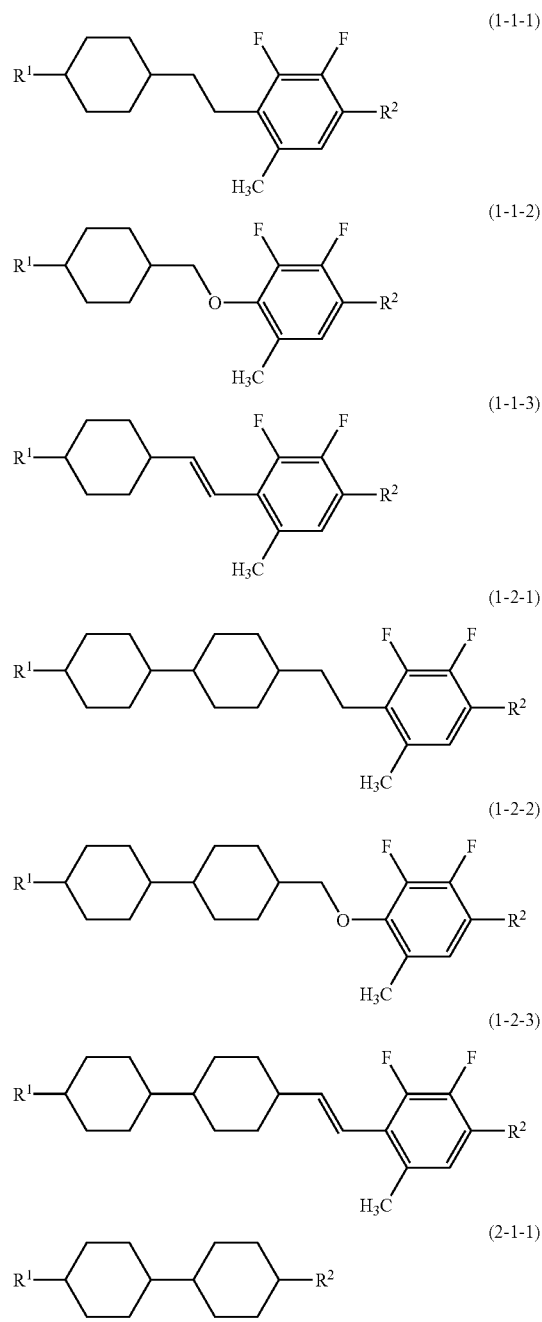

10% to approximately 80% by weight based on the total weight of the liquid crystal composition of the third component.

25. A liquid crystal composition comprising as a first component at least one compound selected from the group of compounds represented by formula (1-1-1) to (1-1-3) and (1-2-1) to (1-2-3), as a second component at least one compound selected from the group of compounds represented by formulae (2-1-1), (2-1-2) and (2-2-1), as a third component at least one compound selected from the group of compounds represented by formulae (3-1-1) and (3-2-1), and as a fourth component at least one compound selected from the group of compounds represented by formulae (4-1-1), (4-2-1), (5-1-1) and (5-2-1):

wherein $R^1$ is independently alkyl having 1 to 10 carbons or alkenyl having 2 to 10 carbons; $R^2$ is independently alkyl having 1 to 10 carbons, alkenyl having 2 to 10 carbons, or alkoxy having 1 to 9 carbons; and wherein the liquid crystal composition has a negative dielectric anisotropy.

24. The liquid crystal composition according to item 23, wherein the liquid crystal composition includes approximately 10% to approximately 85% by weight based on the total weight of the liquid crystal composition of the first component, approximately 5% to approximately 50% by weight based on the total weight of the liquid crystal composition of the second component and approximately -continued

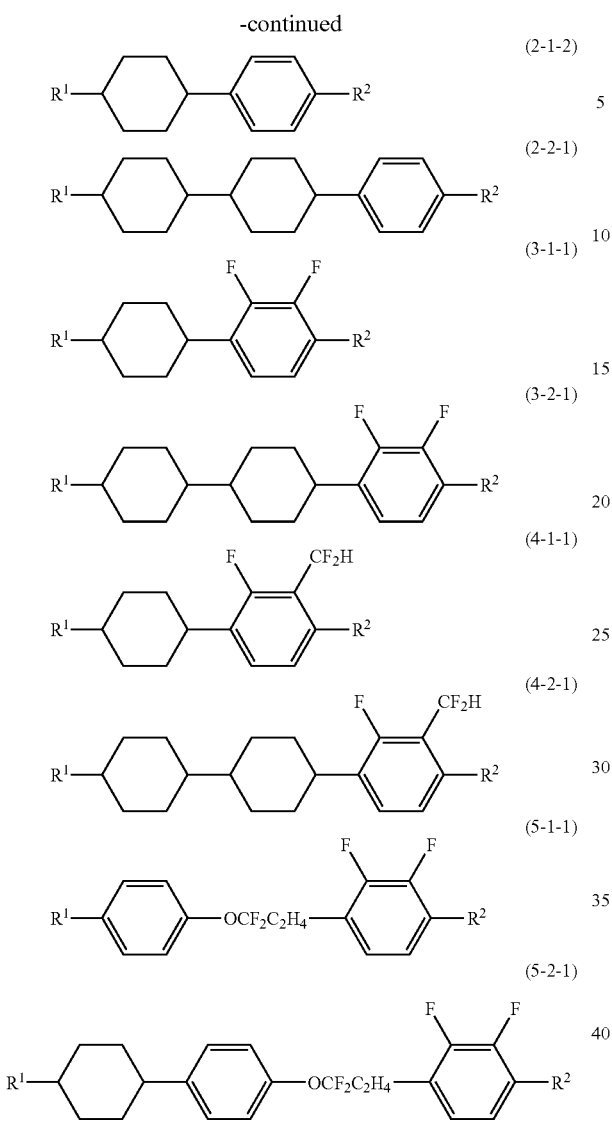

wherein R¹ is independently alkyl having 1 to 10 carbons or alkenyl having 2 to 10 carbons; R² is independently alkyl having 1 to 10 carbons, alkenyl having 2 to 10 carbons, or alkoxy having 1 to 9 carbons; and wherein the liquid crystal composition has a negative dielectric anisotropy.

26. The liquid crystal composition according to item 25, wherein the liquid crystal composition includes approximately 10% to approximately 75% by weight based on the total weight of the liquid crystal composition of the first component, approximately 5% to approximately 50% by weight based on the total weight of the liquid crystal composition of the second component, approximately 10% to approximately 70% by weight based on the total weight of the liquid crystal composition of at least one compound selected from the group of compounds represented by formulae (3-1-1) and (3-2-1) and approximately 10% to approximately 70% by weight based on the total weight of the liquid crystal composition of at least one compound selected from the group of compounds represented by formulae (4-1-1), (4-2-1), (5-1-1) and (5-2-1).

27. A liquid crystal composition comprising as a first component at least one compound selected from the group of compounds represented by formula (1-1-1), (1-2-1) and (1-2-2) and as a second component at least one compound selected from the group of compounds represented by formulae (2-1-1), (2-1-2) and (2-2-1):

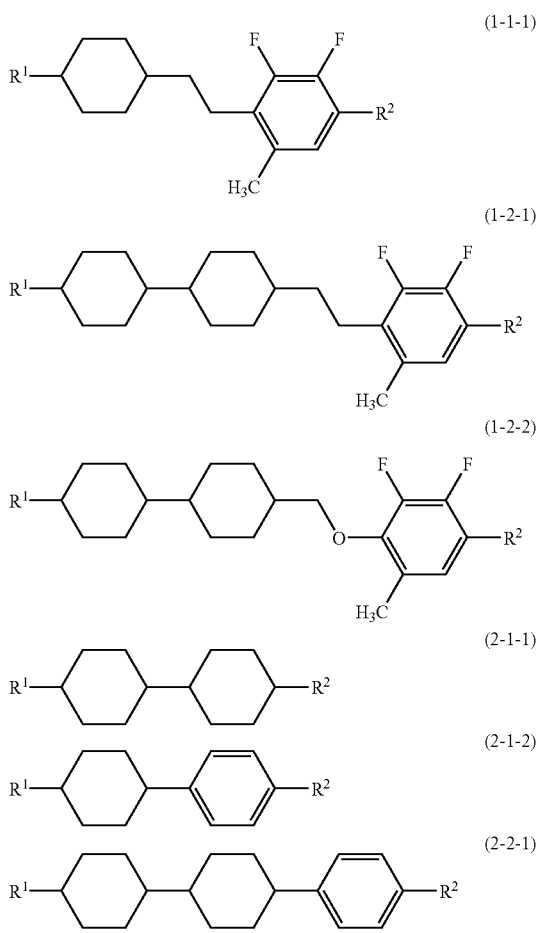

wherein R¹ is independently alkyl having 1 to 10 carbons or alkenyl having 2 to 10 carbons; R² is independently alkyl having 1 to 10 carbons, alkenyl having 2 to 10 carbons, or alkoxy having 1 to 9 carbons; and wherein the liquid crystal composition has a negative dielectric anisotropy.

28. The liquid crystal composition according to item 27, wherein the liquid crystal composition includes approximately 50% to approximately 90% by weight based on the total weight of the liquid crystal composition of the first component and approximately 10% to approximately 50% by weight based on the total weight of the liquid crystal composition of the second component.

29. The liquid crystal composition according to any one of items 1 to 28, wherein the liquid crystal composition has a dielectric anisotropy in a range of approximately −6.5 to approximately −1.5.

30. A liquid crystal display device comprising the liquid crystal composition according to any one of items 1 to 29.

31. The liquid crystal display device according to item 30, wherein the liquid crystal display device has a VA mode or an IPS mode and is driven with an active matrix.

32. A method of using a liquid crystal composition in a liquid crystal display device having a VA mode or an IPS mode and driven with an active matrix, the liquid crystal composition is the liquid crystal composition according to any one of items 1 to 29.

The compositions of the invention exhibit, among other things, a wide temperature range of a nematic phase, a small viscosity, a suitable optical anisotropy, a large negative dielectric anisotropy and a large specific resistance. The compositions are properly balanced regarding many characteristics. The compositions satisfy a wide temperature range of a nematic phase, particularly a liquid crystal composition that satisfies a minimum temperature of a nematic phase of not more than approximately −20° C. The device of the invention contains the composition and has a large voltage holding ratio. The device contains a composition having many characteristics among the characteristics such as a small viscosity, an optical anisotropy ranging from approximately 0.05 to approximately 0.11, and a dielectric anisotropy ranging from approximately −6.5 to approximately −1.5, and is suitable for an AM device having a mode such as VA and IPS.

The composition of the invention will be explained in the following order. First, the constitution of component compounds in the composition will be explained. Second, the main characteristics of the component compounds and the main effects of the compounds on the composition will be explained. Third, a desirable ratio of the component compounds and the basis thereof will be explained. Fourth, a desirable embodiment of the component compounds will be explained. Fifth, concrete examples of the component compound will be shown. Sixth, the preparation methods of the component compound will be explained.

First, the constitution of component compounds in the composition will be explained. The composition of the invention is a liquid crystal composition containing as a first component the compound (1) having a structure of 6-methyl-2,3-difluoro-1,4-phenylene as a component. There are eight combinations of the compound (3) as a first component, a second component and a third component, and the compounds (4) and (5) as the third component. These are classified into types 1 to 8 shown in Table 2 below. In Table 2, the column with the symbol "○" means that the composition may be the component. The column with no symbol means that the component may not be the component. For example, the composition of the type 3 contains the compound (1) and the compound (3) as the components.

|  | First component | Second Component Compound | Third component | |
| --- | --- | --- | --- | --- |
|  | (1) | (2) | (3) | (4), (5) |
| Type 1 | ○ |  |  |  |
| type 2 | ○ | ○ |  |  |
| type 3 | ○ |  | ○ |  |
| type 4 | ○ |  |  | ○ |
| type 5 | ○ |  | ○ | ○ |
| type 6 | ○ | ○ | ○ |  |
| type 7 | ○ | ○ |  | ○ |
| type 8 | ○ | ○ | ○ | ○ |

Table 2 Examples of Combinations of Compounds

The composition of the invention may contain other compounds than those disclosed in Table 2. For example, the type 3 in Table 2 is a compound containing the compounds (1) and (3) but not containing the compounds (2), (4) and (5). The composition of the type 3 may contain a liquid crystal compound other than the compounds (1) to (5).

The first component is at least one compound selected from a group of compounds represented by formula (1). The compound (1) may be either a single compound or plural compounds. This rule is applicable to the compounds represented by the other formulae. Desirable first components include the compounds (1-1-1) to (1-1-4) and (1-2-1) to (1-2-4). The second component is at least one compound selected from a group of the compounds (2-1) to (2-3). Desirable second components include the compounds (2-1-1), (2-1-2), (2-2-1), (2-2-2) and (2-3-1). The third component is at least one compound selected from a group of the compounds (3) to (5). Desirable third components include the compounds (3-1-1), (3-2-1), (3-2-2), (4-1-1), (4-2-1), (4-2-2), (5-1-1) and (5-2-1).

The composition of the invention is classified into the composition A and the composition B. The composition A may further contain other compounds. The "other compounds" include a liquid crystal compound, an additive, an impurity, and so forth. This liquid crystal compound is different from the compounds (1) to (5). Such a liquid crystal compound is mixed with the composition for the purpose of adjusting the characteristics of the composition. Additives include an optically active compound, a coloring matter, an ultraviolet absorbent, an antioxidant, and so forth. The optically active compound is mixed with the composition for the purpose of giving a twist angle by means of inducing a helical structure. The coloring matter is mixed with the composition to suit for the device of a guest host (GH) mode. The antioxidant and the ultraviolet absorbent are mixed with the composition in order to prevent a liquid crystal or an AM device from being deteriorated. The impurity is a compound and so forth contaminated in the process such as the synthesis of a component compound and so forth.

The composition B essentially includes compounds selected from the compounds (1) to (5). The term "essentially" means that the composition does not contain a liquid crystal compound which is different from these compounds. The term "essentially" also means that the composition may further contain the additive, the impurity, and so forth. This means that the composition B may contain compounds such as an impurity, an optically active compound, a coloring matter, an ultraviolet absorbent and an antioxidant contained in the compounds. The components of the composition B are fewer than those of the composition A. The composition B is preferable to the composition A from the viewpoint of costs. The composition A is preferable to the composition B, because characteristics of the composition A can be further adjusted by mixing with other liquid crystal compounds.

Examples of the ultraviolet absorbent include benzophenone, benzoate and triazole. Examples of the benzophenone include 2-hydroxy-4-octoxybenzophenone. Examples of the benzoate include 2,4-di-tert-butylphenyl-3,5-di-tert-butyl-4-hydroxybenzoate. Examples of the triazole include 2-(2-hydroxy-5-methylphenyl)benzotriazole, 2-[2-hydroxy-3-(3,4,5,6-tetrahydroxyphtalimide-methyl)-5-methylphenyl] benzotriazole and 2-(3-tert-butyl-2-hydroxy-5-methylphenyl)-5-chlorobenzotriazole.

Examples of the antioxidant include phenol and an organic sulfur compound. Examples of the phenol include 3,5-di-tert-butyl-4-hydroxytoluene, 2,2'-methylene-bis(6-tert-butyl-4-methylphenol), 4,4'-butylidene-bis(6-tert-butyl-3-methylphenol), 2,6-di-tert-butyl-4-(2-octadecyloxycarbonyl)ethylphenol and pentaerythritol-tetrakis[3-(3,5-di-tert-butyl-4-hydroxyphenyl)propionate]. Examples of the organic sulfur compound include dilauryl-3,3'-thiopropionate, dimyristyl-3,3'-thiopropionate, distearyl-3,3'-thiopropionate, pentaerythritol-tetrakis(3-laurylthiopropionate) and 2-mercaptobenzimidazole.

The amounts of the additive such as the ultraviolet absorbent and the antioxidant are desirably large for attaining the objects. However, too large amounts of the additives are not preferred for the general characteristics of the composition. Upon heating the composition, a large amount of the antioxidant can prevent the specific resistance from being decreased. However, a too large amount of the antioxidant may decrease the maximum temperature of the composition. The preferred ratios of the ultraviolet absorbent and the antioxidant are, for example, from approximately 10 ppm to approximately 500 ppm based on the total weight of the composition. Desirable ratios are from approximately 30 ppm to approximately 300 ppm. More desirable ratios are from approximately 40 ppm to approximately 200 ppm.

Second, the main characteristics of the component compounds and the main effects of the compounds on the composition will be explained. The main characteristics of the component compounds are summarized in Table 3. In Table 3, the letter L represents large or high, the letter M represents a middle degree and the letter S represents small or low. The numeral 0 (zero) indicates that a dielectric anisotropy is nearly zero (or very small). The symbols including L, M and S are relative evaluations of the compounds.

tions to increase the viscosity and increase the negative dielectric anisotropy of the composition. The compound (3) increases the viscosity and increases the negative dielectric anisotropy of the composition. The compound (4) increases the viscosity and especially increases the negative dielectric anisotropy of the composition. The compound (5) decreases the minimum temperature, increases the viscosity, increases the optical anisotropy, and increases the negative dielectric anisotropy of the composition.

Third, a desirable ratio of the component compound and the basis therefor will be explained. The first component is the compound (1). A desirable amount of the first component is approximately 5% by weight or more for decreasing the minimum temperature, increasing the negative dielectric anisotropy, and decreasing the threshold voltage, and is approximately 90% by weight or less for decreasing the minimum temperature. A more desirable amount is from approximately 10% by weight to approximately 75% by weight. A more desirable amount is from approximately 30% by weight to approximately 95% by weight. An especially desirable amount is from approximately 50% by weight to approximately 90% by weight. The second component is the compound (2). A desirable amount of the second component is approximately 5% by weight or more for decreasing the viscosity, and is approximately 75% by weight or less for increasing the negative dielectric anisotropy and decreasing the threshold voltage. A more desirable amount is from approximately 5% by weight to approxi-

|  | Compound (1) | Compound (2-1) | Compound (2-2) | Compound (2-3) | Compound (3) | Compound (4) | Compound (5) |
|---|---|---|---|---|---|---|---|
| Maximum temperature | S-M | S | M | L | S-M | S-M | S-M |
| Viscosity | M-L | S | S | M | M-L | M-L | M-L |
| Optical anisotropy | M | S-M | M | M-L | M | M | M-L |
| Dielectric anisotropy | M[1] | 0 | 0 | 0 | M[1] | M-L[1] | M[1] |
| Specific resistance | L | L | L | L | L | L | L |

[1]The composition has a negative dielectric anisotropy.

Table 3 Characteristics of the Compounds

The main effects of the compounds on the composition will be explained. The compound (1) has a structure of 6-methyl-2,3-difluoro-1,4-phenylene, and has functions of increasing the negative dielectric anisotropy of the compound, especially decreasing the minimum temperature of the composition, and increasing the negative dielectric anisotropy of the composition owing to the methyl group at the 6-position. The compound (1) especially decreases the minimum temperature, decreases the maximum temperature, increases the viscosity, moderates the optical anisotropy, and increases the negative dielectric anisotropy of the composition. The second component functions to decrease the viscosity and decrease the negative dielectric anisotropy of the composition. The compound (2-1) decreases the minimum temperature, decreases the maximum temperature, especially decreases the viscosity, decreases the optical anisotropy, and decreases the negative dielectric anisotropy of the composition. The compound (2-2) increases the maximum temperature, decreases the viscosity, and decreases the negative dielectric anisotropy of the composition. The compound (2-3) especially increases the maximum temperature, decreases the viscosity, increases the optical anisotropy, and decreases the negative dielectric anisotropy of the composition. The third component funcmately 50% by weight. A more desirable amount is from approximately 5% by weight to approximately 70% by weight. An especially desirable amount is from approximately 10% by weight to approximately 50% by weight. The third component is at least one of the the compounds (3) to (5). A desirable amount of the third component is approximately 10% by weight or more for increasing the negative dielectric anisotropy and decreasing the threshold voltage, and is approximately 90% by weight or less for decreasing the minimum temperature. A more desirable amount is from approximately 20% by weight to approximately 80% by weight. A more desirable amount is from approximately 10% by weight to approximately 70% by weight.

Fourth, a desirable embodiment of the component compound will be explained. The symbol $R^1$ was used for many compounds in the chemical formulas for the component compounds. $R^1$ may be identical or different in these compounds. In one case, for example, $R^1$ of the compound (1-1-1) is alkyl and $R^1$ of the compound (2-1-1) is alkenyl. This rule is also applicable to the symbols $R^2$, A, B, $Z^1$, $Z^2$, $X^1$, $X^2$, n and so forth.

$R^1$ is independently alkyl having 1 to 10 carbons or alkenyl having 2 to 10 carbons, and $R^2$ is independently alkyl having 1 to 10 carbons, alkenyl having 2 to 10 carbons, or alkoxy having 1 to 10 carbons.

Desirable R¹ is alkyl having 1 to 8 carbons or alkenyl having 2 to 6 carbons. Desirable R² is alkyl having 1 to 8 carbons, alkenyl having 2 to 6 carbons, or alkoxy having 1 to 8 carbons.

Desirable alkyl is methyl, ethyl, propyl, butyl, pentyl, hexyl, heptyl, or octyl. More desirable alkyl is ethyl, propyl, butyl, pentyl, or heptyl.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl is vinyl, 1-propenyl, 3-butenyl, or 3-pentenyl. A desirable configuration of —CH=CH— in these alkenyl depends on the position of a double bond. Trans is desirable in the alkenyl such as 1-propenyl, 1-butenyl, 1-pentenyl, 1-hexenyl, 3-pentenyl, and 3-hexenyl. Cis is desirable in the alkenyl such as 2-butenyl, 2-pentenyl and 2-hexenyl.

Desirable alkoxy is methoxy, ethoxy, propoxy, butoxy, pentyloxy, hexyloxy, or heptyloxy. More desirable alkoxy is methoxy or ethoxy.

In the component compounds, the steric configuration of 1,4-cyclohexylene is desirably trans rather than cis. The "1,4-phenyelne in which an arbitrary hydrogen is replaced by a fluorine" in ring B includes 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene or 2,3,5,6-tetra-1,4-phenylene. Desirable ring B is 1,4-phenylene, 2-fluoro-1,4-phenylene or 2,3-difluoro-1,4-phenylene. More desirable ring B is 1,4-phenyelen or 2-fluoro-1,4-phenylene. Because 2-fluoro-1,4-phenylene is identical to 3-fluoro-1,4-phenylene, the later is not exemplified. This rule is also applicable to the relationship between 2,5-difluoro-1,4-phenylene and 3,6-difluoro-1,4-phenylene, the relationship between 2-difluoromethyl-3-fluoro-1,4-phenylene and 3-difluoromethyl-2-fluoro-1,4-phenylene, and so forth. For example, the compound (4) includes a compound having 2-difluoromethyl-3-fluoro-1,4-phenylene.

$Z^1$ is independently a single bond, —$C_2H_4$—, —$CH_2O$—, or —CH=CH—. Desirable $Z^1$ is a single bond, —$C_2H_4$—, —$CH_2O$—, or —CH=CH—. $Z^2$ is independently —$CF_2O$—, —$OCF_2$—, —$C_2H_4CF_2O$—, or —$OCF_2C_2H_4$—. Desirable $Z^2$ is —$CF_2O$—, —$OCF_2$—, or —$OCF_2C_2H_4$—. More desirable $Z^2$ is —$OCF_2C_2H_4$—.

One of $X^1$ and $X^2$ is —F, and the other is —$CF_2H$. In the case where $X^1$ is —F, $X^2$ is —$CF_2H$. In the case where $X^1$ is —$CF_2H$, X2 is —F. Desirable $X^1$ and $X^2$ are that $X^1$ is —F and $X^2$ is —$CF_2H$, or $X^2$ is —$CF_2H$ and $X^2$ is —F. More desirable $X^1$ and $X^2$ are that $X^1$ is —F and $X^2$ is —$CF_2H$.

Fifth, concrete examples of the component compound will be shown. Desirable compound (1) includes the compounds (1-1-1) to (1-1-4) and (1-2-1) to (1-2-8). More desirable compound (1) includes the compounds (1-1-1) to (1-1-4) and (1-2-1) to (1-2-4). Especially desirable compound (1) includes the compounds (1-1-1) to (1-1-3) and (1-2-1) to (1-2-3).

Desirable compound (2) includes the compounds (2-1-1), (2-1-2), (2-2-1), (2-2-2) and (2-3-1) to (2-3-4). More desirable compound (2) includes the compounds (2-1-1), (2-1-2), (2-2-1), (2-2-2) and (2-3-1). Especially desirable compound (2) includes the compounds (2-1-1), (2-1-2) and (2-2-1).

Desirable compound (3) includes the compounds (3-1-1), (3-2-1) and (3-2-2). More desirable compound (3) includes the compounds (3-1-1) and (3-2-1).

Desirable compound (4) includes the compounds (4-1-1) to (4-1-5) and (4-2-1) to (4-2-8). More desirable compound (4) includes the compounds (4-1-1), (4-2-1) and (4-2-2).

Especially desirable compound (4) includes the compounds (4-1-1) and (4-2-1).

Desirable compound (5) includes the compounds (5-1-1) to (5-1-3) and (5-2-1) to (5-2-3). More desirable compound (5) includes the compounds (5-1-1) and (5-2-1) to (5-2-3). Especially desirable compound (5) includes the compounds (5-1-1) and (5-2-1).

In these desirable compounds, the specific groups represented by R¹and so forth may be identical or different. This rule has been described hereinabove.

R¹ is independently alkyl having 1 to 10 carbons or alkenyl having 2 to 10 carbons. Desirable R¹ is alkyl having 1 to 8 carbons or alkenyl having 2 to 6 carbons. R² is independently alkyl having 1 to 10 carbons, alkenyl having 2 to 10 carbons, or alkoxy having 1 to 9 carbons. Desirable R² is alkyl having 1 to 8 carbons, alkenyl having 2 to 6 carbons, or alkoxy having 1 to 8 carbons. More desirable alkyl, alkenyl and alkoxy have been described hereinabove. Desirable steric configuration of —CH=CH— in the alkenyl has been described hereinabove. In these desirable compounds, the steric configuration of 1,4-cyclohexylene is desirably trans rather than cis.

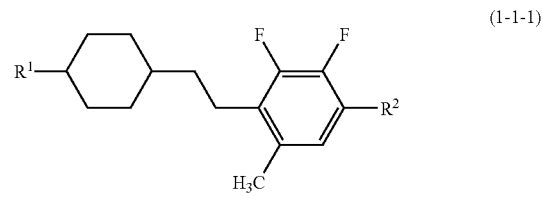

(1-1-1)

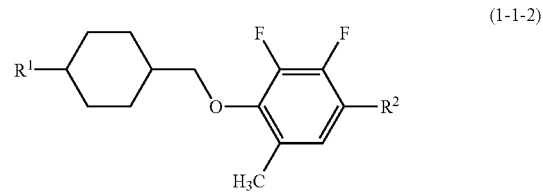

(1-1-2)

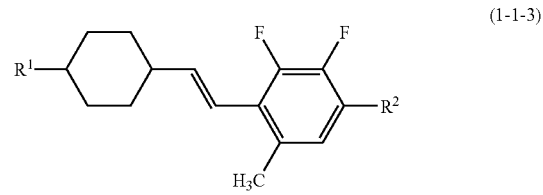

(1-1-3)

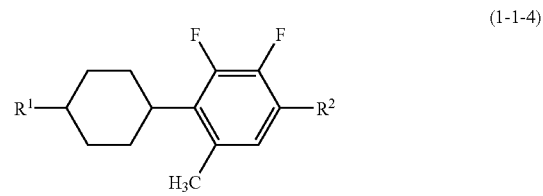

(1-1-4)

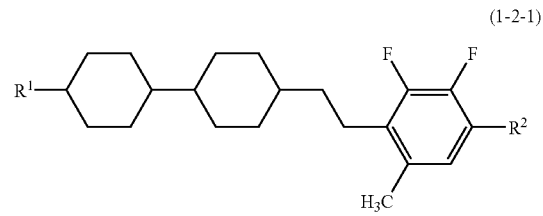

(1-2-1)

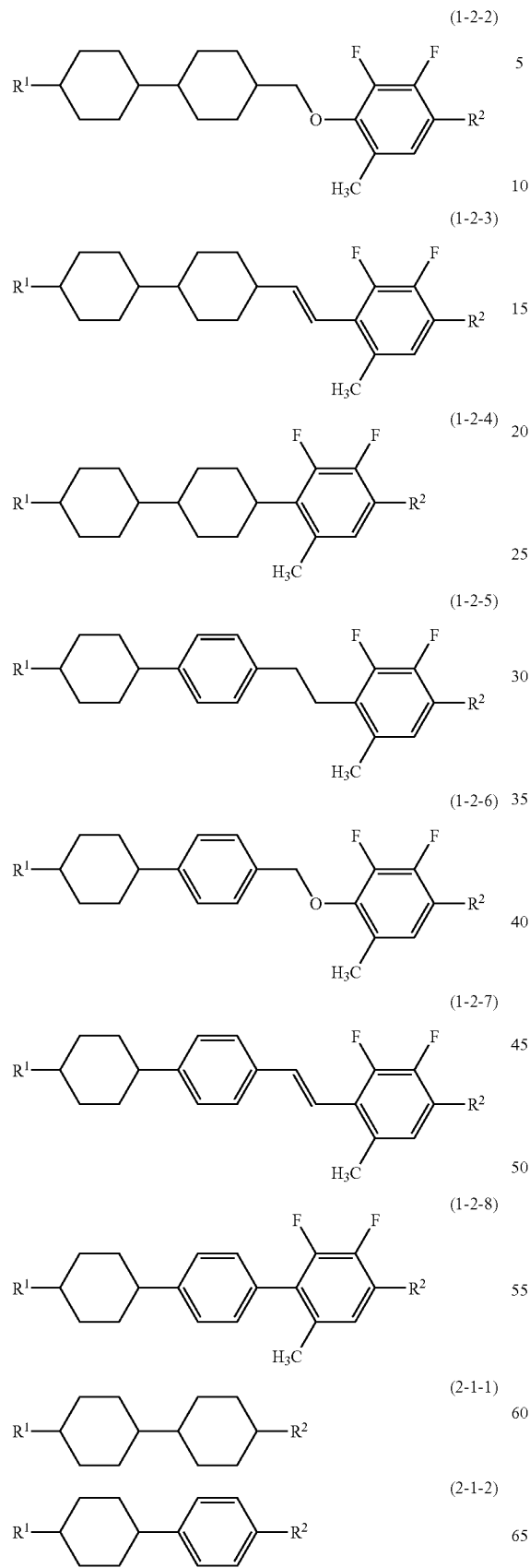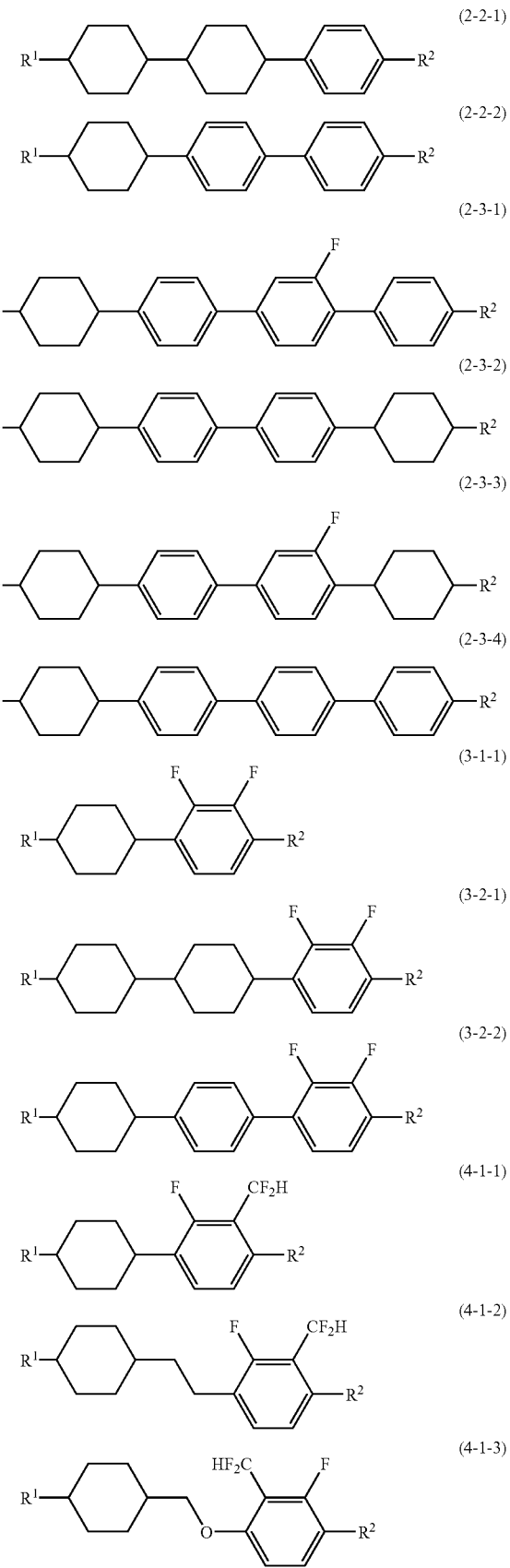

-continued

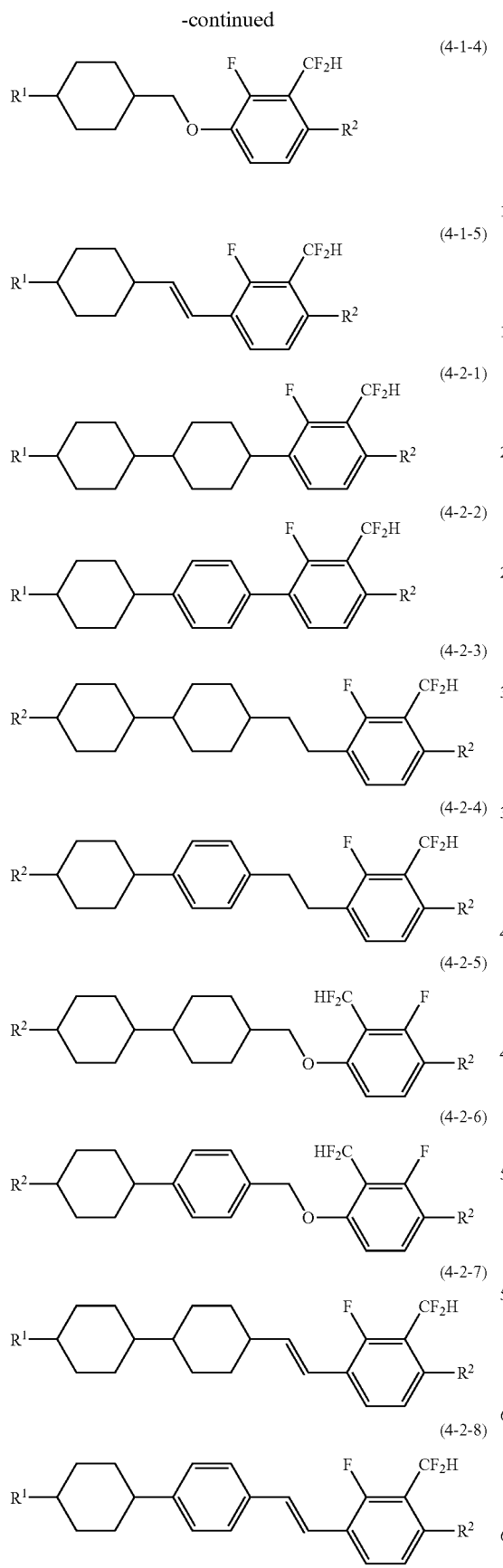

-continued

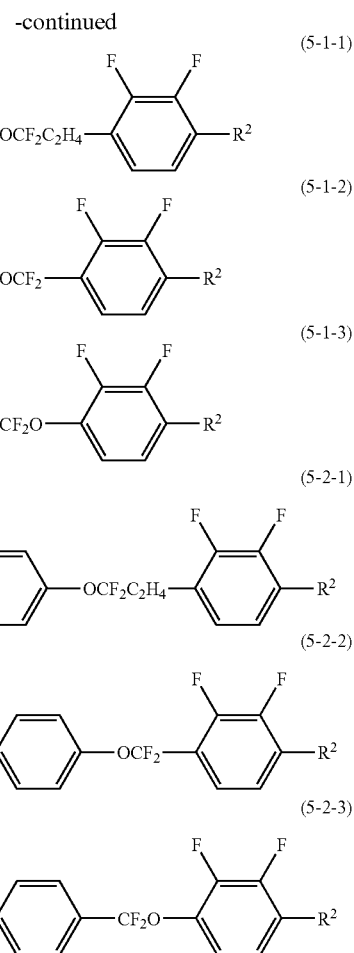

Sixth, the preparation methods of the component compounds will be explained. These compounds can be prepared by known methods. The preparation method will be exemplified below. The compound (1) is prepared by the method disclosed in JP H10-291945 A/1998. The compound (2-1-1) is prepared by the method disclosed in JP S59-70624 A/1984 or JP S60-16940 A/1985. The compounds (3-1-1), (3-2-1) and so forth are prepared by modifying the method disclosed in JP H6-228037 A/1994. The compounds (4-1-1), (4-2-1) and so forth are prepared by modifying the method disclosed in International Application 00/39063 (U.S. Pat. No. 6,576, 303 B1). The compounds (5-1-1), (5-2-1) and so forth are prepared by modifying the method disclosed in JP H9-278698 A/1997 or JP 2003-2858 A.

The compounds for which preparation methods were not described above can be prepared according to the methods described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.), and so forth. The composition is prepared according to known methods using the compounds thus obtained. For example, the component compounds are mixed and dissolved in each other by heating.

The composition of the invention mainly has an optical anisotropy of approximately 0.05 to approximately 0.11 and a dielectric anisotropy of approximately −6.5 to approximately −1.5. A desirable dielectric anisotropy is in a range of approximately −5.0 to approximately −2.5. A composition having an optical anisotropy of approximately 0.05 to approximately 0.18 and a composition having an optical anisotropy of approximately 0.05 to approximately 0.20 may be prepared by controlling the ratios of the component compounds or by mixing other compounds. Accordingly, the composition is suitable for an AM device having a mode such as VA and IPS. The composition is especially suitable for an AM device having a VA mode.

The direction of the electric field in a device having a mode such as TN or VA is perpendicular to the normal line of the substrate. The direction of the electric field in a device having a mode such as IPS is in parallel to the normal line of the substrate. The structure of a device having a VA mode is reported in K. Ohmuro, S. Kataoka, T. Sasaki and Y. Koike, SID '97 Digest of Technical Papers, 28, 845 (1997). The structure of a device having an IPS mode is reported in International Application 91/10936 (U.S. Pat. No. 5,576,867 A). The compositions of the invention may be applicable to these devices.

The composition can be used for an AM device. It can also be used for a PM device. The composition can also be used for an device having a mode such as PC, TN, STN, OCB, and so forth. These devices may be of a reflection type, a transmission type or a semi-transmission type. The composition is also usable for a nematic curvilinear aligned phase (NCAP) device prepared by microcapsulating the composition, and for a polymer dispersed (PD) device in which a three dimensional net-work polymer is formed in the composition, for example, a polymer network (PN) device.

EXAMPLES

The invention will be explained in detail by way of Examples. The invention is not limited by the Examples described below. The compounds in Examples are expressed by the symbols according to the definition in Table 4. In Table 4, the configuration of 1,4-cyclohexylene is trans. The configuration regarding a bonding group of —CH=CH— is trans. The parenthesized number next to the symbolized compounds in the Examples corresponds to the number of the desirable compound. The symbol (-) means other liquid crystal compound. An amount (percentage) of a liquid crystal compound is percentage by weight (% by weight) based on the total weight of liquid crystal compounds. Last, the characteristics of the composition are summarized.

TABLE 4

Method for Description of Compound Using Symbols
R—(A$_1$)—Z$_1$ ... —Z$_n$—(A$_n$)—X

| | Symbol |
|---|---|
| 1) Left Terminal Group R— | |
| C$_n$H$_{2n+1}$— | n— |
| CH$_2$=CH— | V— |
| C$_n$H$_{2n+1}$CH=CH— | nV— |
| CH$_2$=CHC$_n$H$_{2n+1}$— | Vn— |
| 2) Ring Structure —A$_n$— | |

TABLE 4-continued

Method for Description of Compound Using Symbols
R—(A$_1$)—Z$_1$ ... —Z$_n$—(A$_n$)—X

| | Symbol |
|---|---|
| | B |
| | B(2F) |
| | B(3F) |
| | B(2F, 3F) |
| | B(2F, 3F, 6Me) |
| | B(2F, 3CF$_2$H) |
| | B(2CF$_2$H, 3F) |
| | H |
| 3) Bonding Group —Z$_n$— | |
| —COO— | E |
| —CF$_2$O— | CF$_2$O |
| —OCF$_2$— | OCF$_2$ |
| —CF$_2$OC$_2$H$_4$— | CF$_2$O$_2$ |
| —OCF$_2$C$_2$H$_4$- | OCF$_2$2 |
| 4) Right Terminal Group —X | |
| —C$_n$H$_{2n+1}$ | —n |
| —OC$_n$H$_{2n+1}$ | —On |
| —C$_n$H$_{2n}$OC$_m$H$_{2m+1}$ | —nOm |
| —COOCH$_3$ | —EMe |
| —CH=CH$_2$ | —V |
| —C$_n$H$_{2n}$CH=CH$_2$ | —nV |
| 5) Example of Description | |

Example 1
5-H2B(2F, 3F, 6Me)-O2

TABLE 4-continued

Method for Description of Compound Using Symbols
R—(A₁)—Z₁ . . . —Zₙ—(Aₙ)—X

| Symbol |
|---|
| 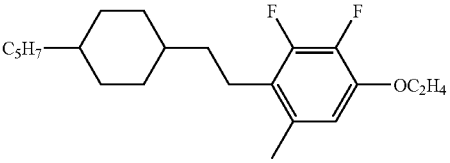<br>Example 2<br>3-HHB(2F, 3F)-O2 |
| 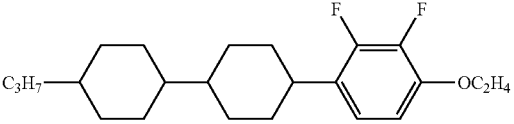<br>Example 3<br>V2-BOCF₂B(2F, 3F)-O2 |
| 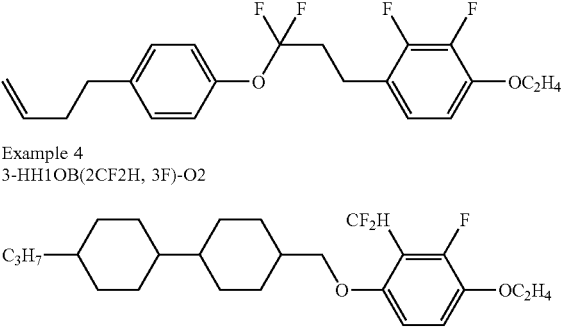<br>Example 4<br>3-HH1OB(2CF2H, 3F)-O2 |
| 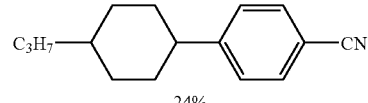 |

The composition is prepared by first measuring components such as a liquid crystal compound and then by mixing them. Thus, it is easy to calculate the percentage by weight of the component. However, it is not easy to calculate exactly the ratios of the components by analyzing the composition with gas chromatography. It is because the correction coefficient depends on the kind of a liquid crystal compound. Fortunately, the correction coefficient is approximately 1. Furthermore, the difference of approximately 1% by weight only slightly influences on characteristics of the composition. Therefore, the peak area ratio of the component peaks in the gas chromatograph can be regarded as a percentage by weight of the component compound. Namely, the results of gas chromatographic analysis (peak area ratio) are considered to be equivalent to the percentage by weight of a liquid crystal compound without correction.

When a sample was a composition, it was measured as it was, and the obtained value is described here. When a sample was a compound, a sample for measurement was prepared by mixing 15% by weight of the compound and 85% by weight of mother liquid crystals. A value of characteristic of the compound was calculated by extrapolating from a value obtained by measurement. Namely: extrapolated value=(value measured −0.85×value measured for mother liquid crystals)/0.15. When a smectic phase (or crystals) separated out at this ratio at 25° C., a ratio of the compound and mother liquid crystals was changed step by step in the order of (10% by weight/90% by weight), (5% by weight/95% by weight), (1% by weight/99% by weight), respectively. Values for a maximum temperature, optical anisotropy, viscosity, and dielectric anisotropy of the compound were obtained by the extrapolation.

The composition of the mother liquid crystals is as shown below.

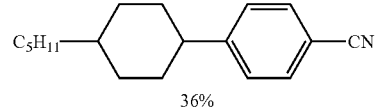

24%

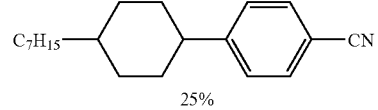

36%

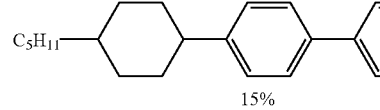

25%

15%

Measurement of the characteristics was carried out according to the following methods. Most methods are described in the Standard of Electric Industries Association of Japan, EIAJ ED-2521 A or those with some modifications. A TFT was not attached to a TN device used for measurement.

A maximum temperature of a nematic phase (NI; ° C.): A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

A minimum temperature of a nematic phase (Tc; ° C.): A sample having a nematic phase was put in a glass vial and then kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals or a smectic phase at −30° C. , Tc was expressed as $\leq -20°$ C. A lower limit of a temperature range of a nematic phase may be abbreviated to "a minimum temperature."

Viscosity (η; mPa·s, measured at 20° C.): A viscosity was measured by means of an E-type rotation viscometer.

Rotation viscosity (γ1; mPa·s, measured at 25° C.): A measurement is carried out according to the method disclosed in M. Imai, et al., Molecular Crystals and Liquid Crystals, vol. 259, p. 37 (1995). A sample was poured into a VA device in which the cell gap between two glass plates was 20 micrometers. The device was applied with a voltage of 30 to 50 volts stepwise by 1 volt. After no voltage application for 0.2 second, application of voltage was repeated with only one rectangular wave (rectangular pulse: 0.2 second) and no application of voltage (2 seconds). A peak current and a peak time of a transient current generated by the application were measured. The value of rotation viscosity was obtained from the measured values and the calculating expression (8) in the article by M. Imai, et al. at p. 40. The dielectric anisotropy required in the calculation was measured by the following method for measuring the dielectric anisotropy.

Optical anisotropy (Δn; measured at 25° C.): Measurement was carried out with an Abbe refractometer mounting a polarizing plate on an ocular using a light at a wavelength of 589 nanometers. The surface of a main prism was rubbed in one direction, and then a sample was dropped on the main prism. Refractive index n∥ was measured when the direction of a polarized light was parallel to that of the rubbing. Refractive index n⊥ was measured when the direction of a polarized light was perpendicular to that of the rubbing. A value of optical anisotropy was calculated from the equation:

$$\Delta n = n\| - n\perp.$$

Dielectric anisotropy (Δε; measured at 25° C.): A sample was poured into a TN device in which the cell gap between two glass plates was 20 micrometers. Sine waves (0.5 volt, 1 kilohertz) were applied onto the device, and a dielectric constant (ε∥) that is parallel to a liquid crystal molecule was measured after 2 seconds. The sample was poured into a TN device in which the cell gap between two glass plates was 9 micrometers and a twist angle was 80 degrees. Sine waves (0.5 volts, 1 kilohertz) were applied onto the device, and a dielectric constant (ε⊥) that is perpendicular to a liquid crystal molecule was measured after 2 seconds. A value of a dielectric anisotropy was calculated from the equation:

$$\Delta \epsilon = \epsilon\| - \epsilon\perp.$$

Threshold voltage (Vth; measured at 25° C.; V): Measurement was carried out with LCD Evaluation System Model LCD-5100 made by Otsuka Electronics Co., Ltd. Light source is a halogen lamp. A sample was poured into a TN device of a normally white mode, in which a cell gap between two glass plates was 5.0 micrometers and a twist angle was 80 degrees. Voltage to be applied onto the device (32 Hz, rectangular waves) was stepwise increased by 0.02 volt starting from zero volt up to 10 volts. During the stepwise increasing, a light was irradiated to the device in a perpendicular direction, and an amount of the light passing through the device was measured. Voltage-transmission curve was prepared, in which a maximum amount of a light corresponded to 100% transmittance, a minimum amount of a light corresponded to 0% transmittance. Threshold voltage is a value at 90% transmittance.

Voltage holding ratio (VHR; measured at 25° C. and 100° C.; %): A TN device used for measurement has a polyimide-alignment film and the cell gap between two glass plates is 6 micrometers. A sample was poured into the device, and then the device was sealed by an adhesive which polymerized by the irradiation of ultraviolet light. The TN device was applied and charged with pulse voltage (60 microseconds at 5 volts). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B. A voltage holding ratio obtained at 25° C. was expressed as VHR-1. A voltage holding ratio obtained at 100° C. was expressed as VHR-2. Next, this TN device was heated at 100° C. for 250 hours. VHR-3 is a voltage holding ratio measured at 25° C. after heating. VHR-4 is a voltage holding ratio measured at 100° C. after heating. VHR-1 and VHR-2 correspond to evaluation of a device at the initial stage. VHR-3 and VHR-4 correspond to evaluation of an device after it has been used for a long time.

Response time (τ; measured at 25° C.; millisecond): Measurement was carried out with LCD Evaluation System Model LCD-5100 made by Otsuka Electronics Co., Ltd. Light source is a halogen lamp. Low-pass filter was set at 5 kilohertz. A sample was poured into a TN device of a normally white mode, in which a cell gap between two glass plates was 5.0 micrometers and a twist angle was 80 degrees. Rectangle waves (60 Hertz, 5 volts, 0.5 seconds) was applied to the device. During applying, a light was irradiated to the device in a perpendicular direction, and an amount of the light passing through the device was measured. A maximum amount of a light corresponds to 100% transmittance, and a minimum amount of a light corresponds to 0% transmission. Rise time (τr) is a period of time required for the change in transmittance from 90% to 10%. Fall time (τf) is a period of time required for the change in transmittance from 10% to 90%. Response time is a sum of rise time and fall time thus obtained.

Gas chromatographic Analysis: Gas Chromatograph Model GC-14B made by Shimadzu was used for measurement. Carrier gas is helium (2 milliliters per minute). An evaporator and a detector (FID) were set up at 280° C. and 300° C., respectively. Capillary column DB-1 (length 30 meters, bore 0.32 millimeters, film thickness 0.25 micrometers; fixed liquid phase is dimethylpolysiloxane; non-polar) made by Agilent Technologies Inc. was used for the separation of the component compound. After the column had been kept at 200° C. for 2 minutes, it was further heated to 280° C. at the rate of 5° C. per minute. A sample was prepared into an acetone solution (0.1% by weight), and 1 microliter of the solution was injected into the evaporator. The recorder used was Chromatopac Model C-R5A made by Shimadzu or its equivalent. Gas chromatogram obtained showed a retention time of a peak and a peak area corresponding to the component compound.

Solvents for diluting the sample may also be chloroform, hexane, and so forth. The following capillary columns may also be used: HP-1 made by Agilent Technologies Inc. (length 30 meters, bore 0.32 millimeters, film thickness 0.25 micrometers), Rtx-1 made by Restek Corporation (length 30 meters, bore 0.32 millimeters, film thickness 0.25 micrometers), and BP-1 made by SGE International Pty. Ltd. (length 30 meters, bore 0.32 millimeters, film thickness 0.25 micrometers). In order to prevent the peaks of the compounds from overlapping with one another, a capillary column, CBP1-M50-025 made by Shimadzu Corp. (length 50 meters, bore 0.25 millimeters, film thickness 0.25 micrometers) may be used. An area ratio of each peak in the gas chromatogram corresponds to a ratio of the component compound. Percentage by weight of the component compound is not completely identical to an area ratio of each peak. According to the invention, however, percentage by weight of the component compound may be regarded to be identical to an area ratio of each peak, when these capillary columns are used. This is because there is no significant difference in correction efficient of component compounds.

Comparative Example

| | | |
|---|---|---|
| 3-HH-4 | (2-1-1) | 7% |
| 3-HH-5 | (2-1-1) | 6% |
| 3-HB—O1 | (2-1-2) | 8% |
| 5-HB-3 | (2-1-2) | 9% |
| 3-HB(2F,3F)-O2 | (3-1-1) | 14% |

-continued

| | | |
|---|---|---|
| 5-HB(2F,3F)-O2 | (3-1-1) | 12% |
| 2-HHB(2F,3F)-1 | (3-2-1) | 14% |
| 3-HHB(2F,3F)-1 | (3-2-1) | 14% |
| 3-HHB(2F,3F)-O2 | (3-2-1) | 8% |
| 5-HHB(2F,3F)-O2 | (3-2-1) | 8% |

NI=67.9° C.; Tc≦−10° C.; Δn=0.080; Δε=−3.0; η=19.9 mPa·s; VHR-1=99.3%.

Example 1

| | | |
|---|---|---|
| 3-H2B(2F,3F,6Me)-O2 | (1-1-1) | 14% |
| 5-H2B(2F,3F,6Me)-O2 | (1-1-1) | 14% |
| 5-H1OB(2F,3F,6Me)-O2 | (1-1-2) | 5% |
| 5-HB(2F,3F,6Me)-O2 | (1-1-4) | 3% |
| 3-HH2B(2F,3F,6Me)-O2 | (1-2-1) | 11% |
| 5-HH2B(2F,3F,6Me)-O2 | (1-2-1) | 11% |
| 3-HH1OB(2F,3F,6Me)-O2 | (1-2-2) | 11% |
| 5-HH1OB(2F,3F,6Me)-O2 | (1-2-2) | 11% |
| V2-HHVB(2F,3F,6Me)-O2 | (1-2-3) | 4% |
| 3-HHVB(2F,3F,6Me)-O2 | (1-2-3) | 8% |
| 5-HHVB(2F,3F,6Me)-O2 | (1-2-3) | 8% |

NI=73.2° C.; Tc≦−20° C.; Δn=0.086; Δε=−4.6; VHR-1=99.2%.

Example 2

| | | |
|---|---|---|
| 3-H2B(2F,3F,6Me)-O2 | (1-1-1) | 15% |
| 5-H2B(2F,3F,6Me)-O2 | (1-1-1) | 15% |
| 3-HH2B(2F,3F,6Me)-O2 | (1-2-1) | 11% |
| 5-HH2B(2F,3F,6Me)-O2 | (1-2-1) | 11% |
| 3-HH1OB(2F,3F,6Me)-O2 | (1-2-2) | 11% |
| 5-HH1OB(2F,3F,6Me)-O2 | (1-2-2) | 11% |
| 3-HH-V1 | (2-1-1) | 6% |
| V-HHB-1 | (2-2-1) | 10% |
| V2-HHB-1 | (2-2-1) | 10% |

NI=81.6° C.; Tc≦−20° C.; Δn=0.083; Δε=−3.4; VHR-1=99.4%.

Example 3

| | | |
|---|---|---|
| 3-H2B(2F,3F,6Me)-O2 | (1-1-1) | 10% |
| 5-H2B(2F,3F,6Me)-O2 | (1-1-1) | 10% |
| 3-HH1OB(2F,3F,6Me)-O2 | (1-2-2) | 8% |
| 5-HH1OB(2F,3F,6Me)-O2 | (1-2-2) | 8% |
| 3-HB(2F,3F)-O2 | (3-1-1) | 12% |
| 5-HB(2F,3F)-O2 | (3-1-1) | 12% |
| 2-HHB(2F,3F)-1 | (3-2-1) | 10% |
| 3-HHB(2F,3F)-1 | (3-2-1) | 10% |
| 3-HHB(2F,3F)-O2 | (3-2-1) | 10% |
| 5-HHB(2F,3F)-O2 | (3-2-1) | 10% |

NI=71.3° C.; Tc≦−30° C.; Δn=0.086; Δε=−4.5; η=36.6 mPa·s; VHR-1=99.2%.

Example 4

| | | |
|---|---|---|
| 3-HH1OB(2F,3F,6Me)-O2 | (1-2-2) | 10% |
| 5-HH1OB(2F,3F,6Me)-O2 | (1-2-2) | 10% |
| 3-HHVB(2F,3F,6Me)-O2 | (1-2-3) | 8% |
| 3-HH-4 | (2-1-1) | 7% |
| 3-HH-5 | (2-1-1) | 6% |
| 3-HB-O1 | (2-1-2) | 8% |
| 5-HB-3 | (2-1-2) | 9% |
| 3-HB(2F,3F)-O2 | (3-1-1) | 14% |
| 5-HB(2F,3F)-O2 | (3-1-1) | 12% |
| 3-HHB(2F,3F)-O2 | (3-2-1) | 8% |
| 5-HHB(2F,3F)-O2 | (3-2-1) | 8% |

NI=74.2° C.; Tc≦−20° C.; Δn=0.082; Δε=−3.4; η=26.3 mPa·s; VHR-1=99.4%.

Example 5

| | | |
|---|---|---|
| 3-H2B(2F,3F,6Me)-O2 | (1-1-1) | 5% |
| 5-H2B(2F,3F,6Me)-O2 | (1-1-1) | 5% |
| 3-HH2B(2F,3F,6Me)-O2 | (1-2-1) | 5% |
| 5-HH2B(2F,3F,6Me)-O2 | (1-2-1) | 5% |
| 3-HH1OB(2F,3F,6Me)-O2 | (1-2-2) | 8% |
| 5-HH1OB(2F,3F,6Me)-O2 | (1-2-2) | 8% |
| 5-HH-V | (2-1-1) | 20% |
| 3-HB-O2 | (2-1-2) | 8% |
| 3-HH1OB(2CF$_2$H,3F)-O2 | (4-2-5) | 8% |
| 5-HH1OB(2CF$_2$H,3F)-O2 | (4-2-5) | 8% |
| 3-HBOCF$_2$2B(2F,3F)-O2 | (5-2-1) | 10% |
| 5-HBOCF$_2$2B(2F,3F)-O2 | (5-2-1) | 10% |

NI=80.3° C.; Tc≦−30° C.; Δn=0.089; Δε=−3.7; η=33.3 mPa·s; VHR-1=99.3%.

Example 6

| | | |
|---|---|---|
| 3-HH2B(2F,3F,6Me)-O2 | (1-2-1) | 10% |
| 5-HH2B(2F,3F,6Me)-O2 | (1-2-1) | 10% |
| 5-HH-V | (2-1-1) | 18% |
| 3-HH-V1 | (2-1-1) | 7% |
| 3-HB-O2 | (2-1-2) | 6% |
| V-HHB-1 | (2-2-1) | 10% |
| V2-HHB-1 | (2-2-1) | 8% |
| 5-HBB(3F)B-2 | (2-3-1) | 3% |
| 5-HB(2F,3CF$_2$H)-O2 | (4-1-1) | 5% |
| 5-HB(2F,3CF$_2$H)-O4 | (4-1-1) | 3% |
| 3-HHB(2F,3CF$_2$H)-O2 | (4-2-1) | 10% |
| 5-HHB(2F,3CF$_2$H)-O2 | (4-2-1) | 10% |

NI=90.1° C.; Tc≦−20° C.; Δn=0.080; Δε=−31 3.2; η=39.1 mPa·s; VHR-1=99.4%.

Example 7

| | | |
|---|---|---|
| 3-HH1OB(2F,3F,6Me)-O2 | (1-2-2) | 8% |
| 5-HH1OB(2F,3F,6Me)-O2 | (1-2-2) | 8% |
| 2-HH-5 | (2-1-1) | 5% |
| 3-HH-4 | (2-1-1) | 15% |
| 3-HH-5 | (2-1-1) | 8% |

-continued

| | | |
|---|---|---|
| 3-HHB-1 | (2-2-1) | 5% |
| 3-HHB-3 | (2-2-1) | 5% |
| 3-HHB-O1 | (2-2-1) | 3% |
| 3-HB(2F,3F)-O2 | (3-1-1) | 10% |
| 3-HB(2F,3F)-O4 | (3-1-1) | 10% |
| 3-HHB(2F,3F)-O2 | (3-2-1) | 5% |
| 3-HBB(2F,3F)-O2 | (3-2-2) | 5% |
| 3-HH1OH-3 | (-) | 3% |
| 3-HB(3F)B(2F,3F)-O2 | (-) | 5% |
| 3-HB(2F)B(2F,3F)-O2 | (-) | 5% |

NI=88.1° C.; Tc≦−20° C.; Δ$n$=0.078; Δε=−3.4;
η=24.7 mPa·s; VHR-1=99.4%.

Example 8

| | | |
|---|---|---|
| 3-H2B(2F,3F,6Me)-O2 | (1-1-1) | 4% |
| 3-HH2B(2F,3F,6Me)-O2 | (1-2-1) | 8% |
| 3-HH-4 | (2-1-1) | 6% |
| 3-HH-5 | (2-1-1) | 6% |
| 3-HHB-3 | (2-2-1) | 2% |
| 3-HB(2F,3F)-O2 | (3-1-1) | 14% |
| 5-HB(2F,3F)-O2 | (3-1-1) | 12% |
| 2-HHB(2F,3F)-1 | (3-2-1) | 13% |
| 3-HHB(2F,3F)-1 | (3-2-1) | 13% |
| 3-HBOCF$_2$B(2F,3F)-O2 | (5-2-1) | 11% |
| 5-HBOCF$_2$B(2F,3F)-O2 | (5-2-1) | 11% |

NI=73.2° C.; Tc≦−20° C.; Δ$n$=0.087; Δε=−3.7;
η=29.0 mPa·s; VHR-1=99.3%.

Example 9

| | | |
|---|---|---|
| 3-H2B(2F,3F,6Me)-O2 | (1-1-1) | 6% |
| V2-H2B(2F,3F,6Me)-O2 | (1-1-1) | 6% |
| 3-HH2B(2F,3F,6Me)-3 | (1-2-1) | 8% |
| 3-HH2B(2F,3F,6Me)-O2 | (1-2-1) | 8% |
| 3-HH2B(2F,3F,6Me)-O4 | (1-2-1) | 8% |
| 3-HH-V1 | (2-1-1) | 8% |
| 5-HH-V | (2-1-1) | 26% |
| 3-HB-O2 | (2-1-2) | 8% |
| V-HHB-1 | (2-2-1) | 8% |
| V2-HHB-1 | (2-2-1) | 8% |
| 3-HHB-3 | (2-2-1) | 6% |

NI=80.2° C.; Tc≦−20° C.; Δ$n$=0.070; Δε=−1.7;
VHR-1=99.4%.

Example 10

| | | |
|---|---|---|
| 3-H2B(2F,3F,6Me)-O2 | (1-1-1) | 10% |
| 5-H2B(2F,3F,6Me)-O2 | (1-1-1) | 10% |
| 3-HH2B(2F,3F,6Me)-O2 | (1-2-1) | 8% |
| 5-HH2B(2F,3F,6Me)-O2 | (1-2-1) | 8% |
| 3-HH1OB(2F,3F,6Me)-O2 | (1-2-2) | 8% |
| 5-HH1OB(2F,3F,6Me)-O2 | (1-2-2) | 8% |
| 3-HH-V1 | (2-1-1) | 6% |
| 5-HH-V | (2-1-1) | 13% |
| 3-HH-O2 | (2-1-2) | 6% |
| V-HHB-1 | (2-2-1) | 10% |
| V2-HHB-1 | (2-2-1) | 10% |
| 3-HHB-O1 | (2-2-1) | 3% |

NI=83.7° C.; Tc≦−20° C.; Δ$n$=0.078; Δε=−2.4;
VHR-1=99.3%.

What is claimed is:

1. A liquid crystal composition comprising as a first component at least two compounds selected from the group of compounds represented by formula (1):

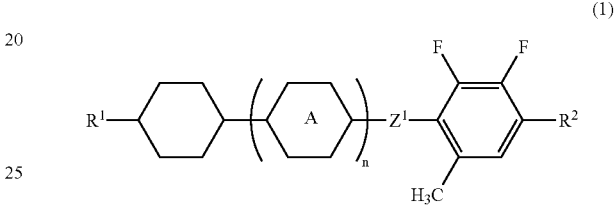

wherein $R^1$ is independently alkyl having 1 to 10 carbons or alkenyl having 2 to 10 carbons; $R^2$ is independently alkyl having 1 to 10 carbons, alkenyl having 2 to 10 carbons, or alkoxy having 1 to 9 carbons; $Z^1$ is independently a single bond, —$C_2H_4$—, —$CH_2O$—, or —CH═CH—; ring A is independently 1,4-cyclohexylene or 1,4-phenylene; n is independently 0 or 1; wherein the liquid crystal composition has a negative dielectric anisotropy; and wherein the liquid crystal composition includes approximately 20% to approximately 60% by weight based on the total weight of the liquid crystal composition of the component of the compound represented by formula (1) wherein n =0 and approximately 40% to approximately 80% by weight based on the total weight of the liquid crystal composition of the component of the compound represented by formula (1) wherein n =1.

2. A liquid crystal composition comprising as a first component at least one compound selected from the group of compounds represented by formula (1), and as a second component at least one compound selected from the group of compounds represented by formulae (2-1) to (2-3):

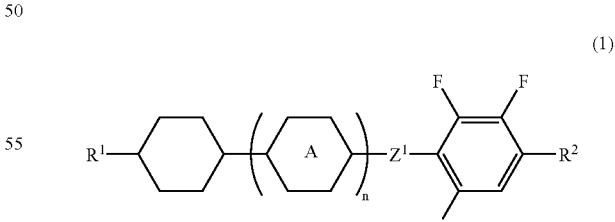

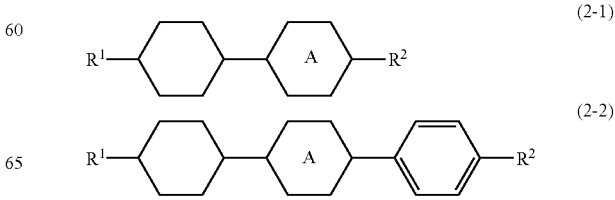

-continued (2-3)
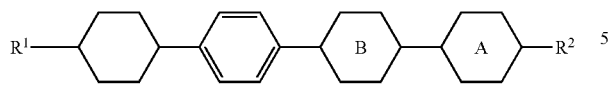

wherein $R_1$ is independently alkyl having 1 to 10 carbons or alkenyl having 2 to 10 carbons; $R^2$ is independently alkyl having 1 to 10 carbons, alkenyl having 2 to 10 carbons, or alkoxy having 1 to 9 carbons; ring A is independently 1,4-cyclohexylene or 1,4-phenylene; ring B is independently 1,4-phenylene or 1,4-phenylene in which an arbitrary hydrogen is replaced by a fluorine; n is independently 0 or 1; wherein the liquid crystal composition has a negative dielectric anisotropy; wherein the liquid crystal composition includes approximately 30% to approximately 95% by weight based on the total weight of the liquid crystal composition of the first component, and approximately 5% to approximately 70% by weight based on the total weight of the liquid crystal composition of the second component.

3. The liquid crystal composition according to claim 2, wherein the first component is at least one compound selected from the group of compounds represented by formula (1-1):

(1-1)
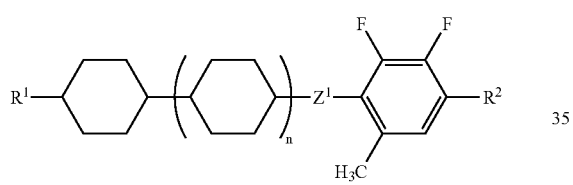

wherein $R^1$ is independently alkyl having 1 to 10 carbons or alkenyl having 2 to 10 carbons; $R^2$ is independently alkyl having 1 to 10 carbons, alkenyl having 2 to 10 carbons, or alkoxy having 1 to 9 carbons; $Z^1$ is independently a single bond, —$C_2H_4$—, —$CH_2O$—, or —CH═CH—; and n is independently 0 or 1.

4. The liquid crystal composition according to claim 2, wherein the first component is at least one compound selected from the group of compounds represented by formulae (1-1-1) to (1-1-4) and (1-2-1) to (1-2-4):

(1-1-1)
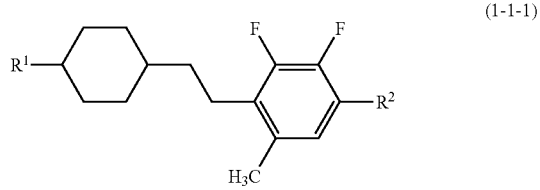

(1-1-2)
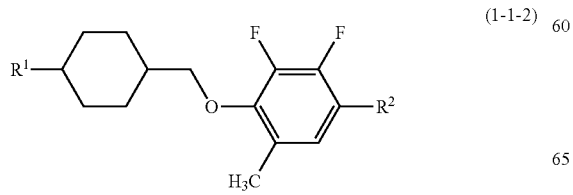

(1-1-3)
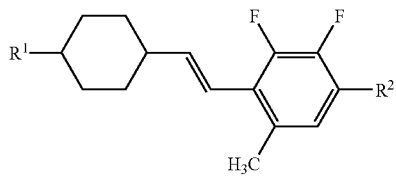

(1-1-4)
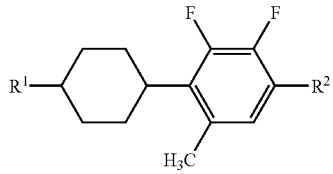

(1-2-1)
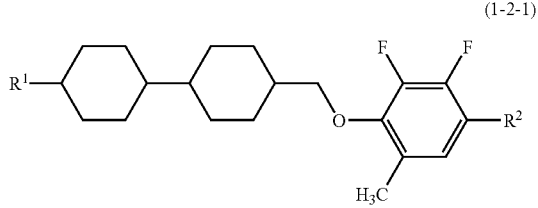

(1-2-2)
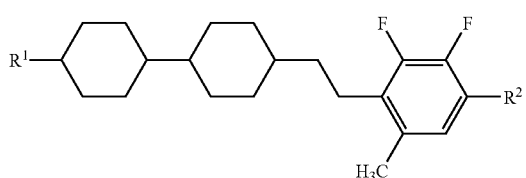

(1-2-3)
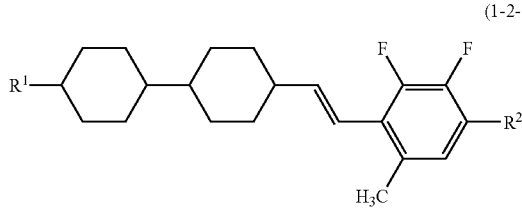

(1-2-4)
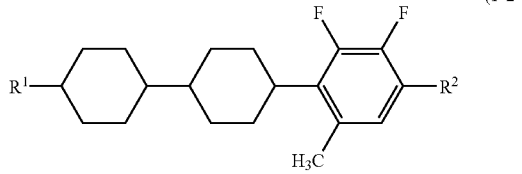

wherein $R_1$ is independently alkyl having 1 to 10 carbons or alkenyl having 2 to 10 carbons; and $R^2$ is independently alkyl having 1 to 10 carbons, alkenyl having 2 to 10 carbons, or alkoxy having 1 to 9 carbons.

5. The liquid crystal composition according to claim 2, wherein the second component is at least one compound selected from the group of compounds represented by formulae (2-1-1), (2-1-2), (2-2-1), (2-2-2) and (2-3-1):

(2-1-1)
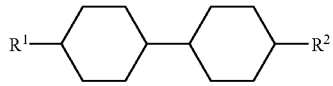

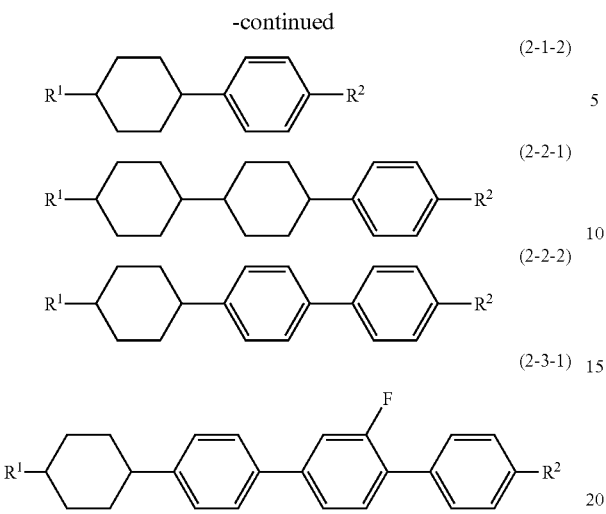

wherein R₁ is independently alkyl having 1 to 10 carbons or alkenyl having 2 to 10 carbons; and R₂ is independently alkyl having 1 to 10 carbons, alkenyl having 2 to 10 carbons, or alkoxy having 1 to 9 carbons.

6. A liquid crystal composition comprising as a first component at least one compound selected from the group of compounds represented by formula (1-1-1), (1-2-1) and (1-2-2) and as a second component at least one compound selected from the group of compounds represented by formulae (2-1-1), (2-1-2) and (2-2-1):

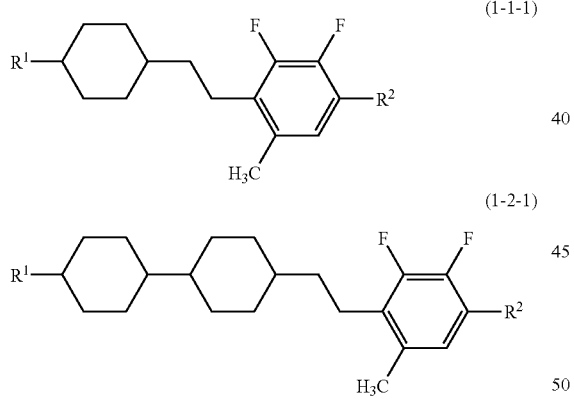

wherein R is independently alkyl having 1 to 10 carbons or alkenyl having 2 to 10 carbons; $R^2$ is independently alkyl having 1 to 10 carbons, alkenyl having 2 to 10 carbons, or alkoxy having 1 to 9 carbons; and wherein the liquid crystal composition has a negative dielectric anisotropy; and wherein the liquid crystal composition includes approximately 50% to approximately 90% by weight based on the total weight of the liquid crystal composition of the first component and approximately 10% to approximately 50% by weight based on the total weight of the liquid crystal composition of the second component.

7. The liquid crystal composition according to claim 6, wherein the liquid crystal composition has a dielectric anisotropy in a range of approximately −6.5 to approximately −1.5.

8. A liquid crystal display device comprising the liquid crystal composition according to claim 6.

9. The liquid crystal display device according to claim 8, wherein the liquid crystal display device has a VA mode or an IPS mode and is driven with an active matrix.

* * * * *